(12) United States Patent
Hayner et al.

(10) Patent No.: US 9,234,664 B1
(45) Date of Patent: Jan. 12, 2016

(54) BACKWARD-COMPATIBLE, PROGRAMMABLE, AND ON-DEMAND WATER HEATER AND RECIRCULATION PUMP CONTROL UNIT AND METHOD OF USING

(71) Applicants: Robert Edward Hayner, Pebble Beach, CA (US); Robert Ashley Hayner, Charleston, SC (US)

(72) Inventors: Robert Edward Hayner, Pebble Beach, CA (US); Robert Ashley Hayner, Charleston, SC (US)

(*) Notice: Subject to any disclaimer, the term of this patent is extended or adjusted under 35 U.S.C. 154(b) by 0 days.

(21) Appl. No.: 14/545,118

(22) Filed: Mar. 28, 2015

(51) Int. Cl.
- *F24D 19/10* (2006.01)
- *F24D 17/00* (2006.01)
- *F24D 3/02* (2006.01)

(52) U.S. Cl.
CPC ............ *F24D 19/1006* (2013.01); *F24D 3/02* (2013.01); *F24D 17/0078* (2013.01); *F24D 17/0031* (2013.01); *F24D 17/0094* (2013.01)

(58) Field of Classification Search
CPC ........... F24D 19/1006; F24D 19/1009; F24D 19/1051; F24D 19/1096; F24D 3/02; F24D 17/0031; F24H 1/0018; F24H 1/0027; F24H 9/2007; F24H 9/2014
USPC ........... 237/8 A, 8 D, 81, 51; 122/14.1, 14.3, 122/14.31; 236/20 R, 25 R
IPC ..................... F24D 19/10, 17/00, 3/02
See application file for complete search history.

(56) References Cited

U.S. PATENT DOCUMENTS

| | | | |
|---|---|---|---|
| 4,016,402 A | 4/1977 | Scott | |
| 4,166,944 A | 9/1979 | Scott | |
| 4,355,544 A * | 10/1982 | Post | F24D 19/1009 337/360 |
| 4,371,779 A | 2/1983 | Maynard et al. | |
| 4,413,775 A | 11/1983 | Scott | |
| 4,467,178 A | 8/1984 | Swindle | |
| 4,549,160 A | 10/1985 | McGhee | |
| 4,606,325 A | 8/1986 | Lujan, Jr. | |
| 4,692,051 A | 9/1987 | Stansbury, Jr. et al. | |
| 4,832,259 A | 5/1989 | Vandermeyden | |
| 4,936,289 A | 6/1990 | Peterson | |
| 5,103,078 A | 4/1992 | Boykin et al. | |
| 5,735,291 A | 4/1998 | Kaonohi | |
| 5,829,467 A | 11/1998 | Spicher | |
| 5,829,475 A | 11/1998 | Acker | |
| 5,839,655 A | 11/1998 | Iritani | |
| 5,968,393 A | 10/1999 | Demaline | |
| 6,375,087 B1 | 4/2002 | Day et al. | |
| 6,920,843 B1 | 7/2005 | Wilson | |
| 7,015,432 B2 | 3/2006 | Valbh et al. | |
| 7,036,520 B2 | 5/2006 | Pearson, Jr. | |
| 7,712,677 B1 | 5/2010 | Munsterhuis et al. | |
| 7,744,008 B2 | 6/2010 | Chapman, Jr. et al. | |
| 8,022,647 B1 | 9/2011 | Davis et al. | |
| 2001/0048811 A1 * | 12/2001 | Waithe | F24D 19/1051 392/474 |
| 2006/1096956 | 9/2006 | Freer | |
| 2010/0096018 A1 * | 4/2010 | Wylie | F24D 17/0078 137/2 |
| 2010/0178043 A1 * | 7/2010 | Tanaka | F24D 12/02 392/496 |

(Continued)

FOREIGN PATENT DOCUMENTS

JP  2006284080 A * 10/2006

*Primary Examiner* — Gregory Huson
*Assistant Examiner* — Daniel E Namay

(57) ABSTRACT

A programmable and on-demand hot water heater unit that locally and remotely changes the set temperature for a conventional water heater and locally and remotely activates the hot water recirculation pump associated with a conventional hot water heating system.

7 Claims, 25 Drawing Sheets

(56) References Cited

U.S. PATENT DOCUMENTS

| | | |
|---|---|---|
| 2010/0251974 A1 | 10/2010 | Showen |
| 2011/0062248 A1 | 3/2011 | Subramanian |
| 2012/0055419 A1* | 3/2012 | Beyerle .............. F24D 19/1009 122/14.1 |
| 2012/0239221 A1* | 9/2012 | Mighdoll ............ F24F 11/0012 700/300 |
| 2013/0043318 A1* | 2/2013 | Broderick .......... F24D 19/1009 236/46 R |
| 2013/0270350 A1* | 10/2013 | Subramanian ..... G05D 23/1917 236/20 R |
| 2014/0261763 A1* | 9/2014 | Beckman ............ F24D 17/0005 137/337 |
| 2015/0148971 A1* | 5/2015 | Acker ................. F24D 19/1063 700/282 |
| 2015/0276237 A1* | 10/2015 | Daniels .................. F24D 19/10 237/2 A |
| 2015/0276239 A1* | 10/2015 | Fadell ....................... F24D 3/08 237/2 A |

* cited by examiner

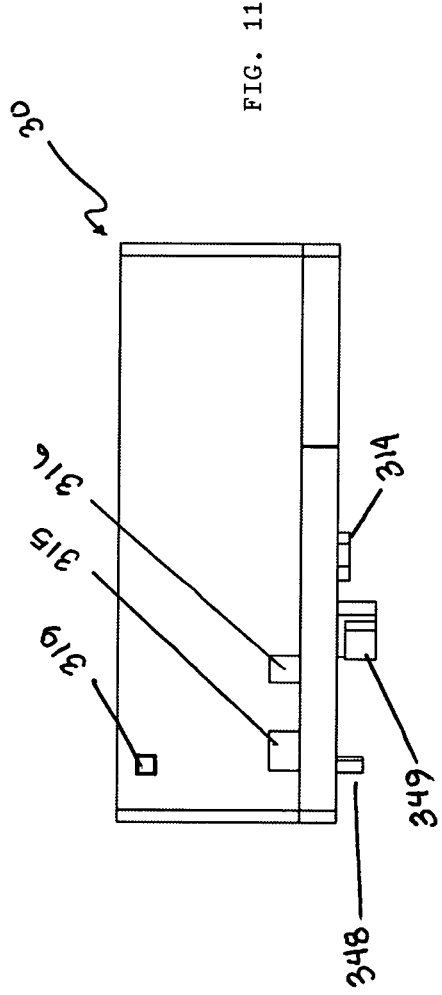
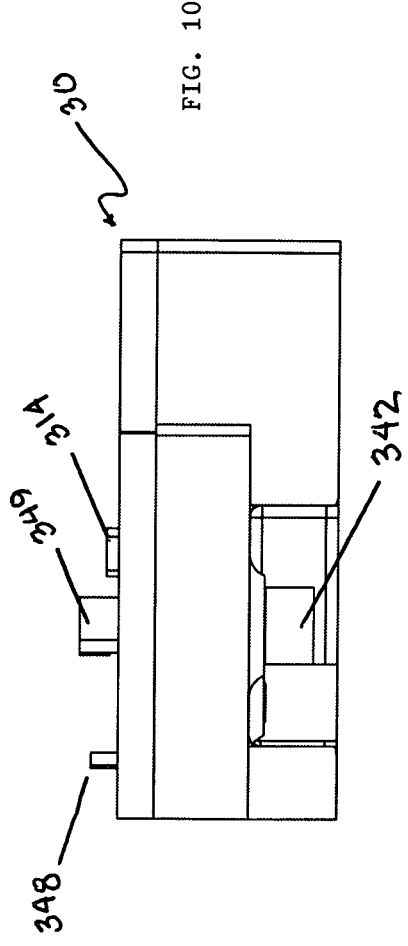

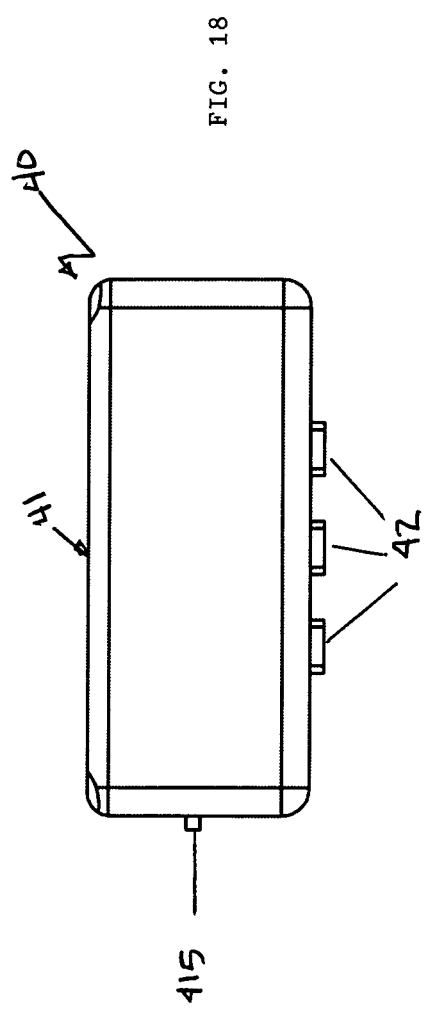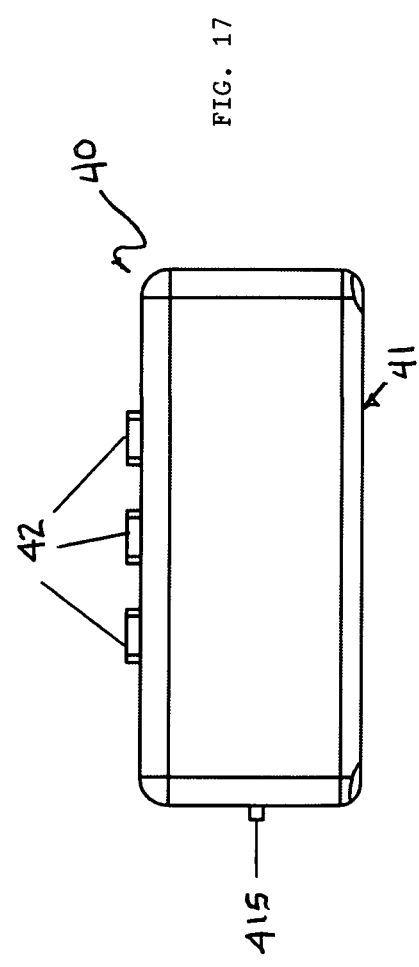

BACKWARD-COMPATIBLE, PROGRAMMABLE, AND ON-DEMAND WATER HEATER AND RECIRCULATION PUMP CONTROL UNIT AND METHOD OF USING

BACKGROUND OF THE INVENTION

1. Technical Field

The invention, a Backward-compatible, Programmable, and On-demand Water Heater and Recirculation Pump Control Unit (hereinafter sometimes referred to as "Control Unit") generally relates to devices that regulate residential and commercial hot water heating and recirculation systems and devices that regulate the temperature and movement of water through them. More particularly, the present invention relates to devices that can be retrofitted and mounted onto an already installed commercially available tank-type hot-water heater to regulate the temperature of the water in a hot water heating system and the movement of water through a hot water recirculation system in response to programmable, locally or remotely entered commands as well as an on-demand signal.

2. Background of the Invention

Tank-type hot water heaters, which are the most common type of hot water heaters found in the home typically use natural gas, propane gas, fuel oil, or electricity to heat the water in the tank to a predetermined or "set" temperature. The tank serves as a storage vessel as well as a heating vessel. Cold water is delivered to the bottom of the tank through a cold-water inlet pipe and heated water exits the tank through a hot-water outlet pipe. The hot-water outlet pipe connects to the house's piping system to deliver heated water to various fixtures throughout the house.

Hot water heaters typically use a thermostat of some type to establish a predetermined set temperature and then control the temperature of the water in the tank by activating and deactivating the heating source. The thermostat consists of an internal (inside the tank) thermometer or other heat sensing device connected by an electrical or electronic circuit to a temperature control device which establishes the set temperature. The temperature control device is connected by an electrical or electronic circuit to the heating source. For electric water heaters, the heating source is one or more electric heating elements which protrude horizontally from the sides of the tank into the water. Fuel-fired water heaters use fuel oil, natural gas, or propane gas piped to a burner located at the bottom of the tank as a heating source.

When the water inside the hot water heater reaches a predetermined temperature below the set temperature, the thermometer in the thermostat senses this decrease in temperature and sends an activating signal to the heating source which heats (or reheats) the water inside the hot water heater until it reaches the set temperature established by the thermostat. When the temperature in the tank reaches the set temperature established by the thermostat, the thermostat sends a deactivation signal to the heating source.

The decrease in temperature inside the tank is typically caused by static cooling of the water inside the tank; that is to say, the water just sits inside the tank and gradually cools down. However, the decrease in temperature can also be caused by demand. When a demand for hot water is placed on the house's hot water system (such as by turning on a hot water faucet or activating a washing machine), cold water enters the hot water heating/storage tank to replace the hot water entering the house through the open plumbing fixture.

Once the heated water leaves the hot water heater, it is transferred by water pressure into the pipe lines servicing the various plumbing fixtures throughout the house. Unless the house is equipped with a hot-water recirculation system, the hot water tends to remain in those pipe lines and, as a result, will cool rapidly if not used by the occupants. Accordingly, when the occupant of the house turns on the hot water faucet, cold water will come out until the cooler water standing in the pipe lines is replaced by heated water coming from the hot water heater. However, many homes are equipped with a hot water recirculation system that, by means of an external pump (typically powered by electricity), recirculates the water from the pipe lines back into the hot water heater so that heated water is always in the pipe lines and immediately accessible to the occupants of the house.

The heating cycle described in the foregoing paragraphs will continue as long as there is energy going to the heating source (electric current going to the heating elements and fuel oil, propane, or natural gas going to the burner jets). While hot water on demand is a service that has become essential in the daily lives of most people, the heating and cooling cycle that provides hot water on demand is not always the most energy-efficient method of providing this service.

The process of running tap water until the cold water resting in the pipe lines is replaced with heated water from the hot water heater simply sends all of that cold water down the drain resulting in the waste of several gallons of water each time any hot water faucet is turned on for the first time. Further, an occupant may initiate a demand for hot water on the tail end of the cooling cycle and thereby receive water that is cooler than the desired set temperature. As a result, the occupant will typically raise the set temperature which requires more energy (electricity, fuel oil, natural gas, or propane gas) to provide hot water at the desired temperature on demand at any time. The occupant might also continue running (and wasting) the water with the hope that it will eventually get hotter. Finally, as mentioned previously, the cooling and reheating cycle will continue whether there's any demand for hot water or not. Accordingly, water is continuously reheated during non-demand periods such as during the night, during the day while the occupants are absent from the house, and, more significantly, during extended absences such as weekends away from the home or vacations. While some energy-conscious occupants might think to set the thermostat on a vacation or low-demand setting, most occupants do not which results in a significant waste of energy as water is continuously heated for an empty house.

The prior art contains numerous examples of devices and methods that attempt to solve these problems. These inventions include, without limitation, devices that remotely program the thermostat for a more energy-efficient regulation of water temperature in the tank, devices that recirculate water from the pipe lines back into the hot water tank, and devices that make it easier to manually change the temperature control devices that input the set temperature to the thermostat.

With respect to devices that make it easier to manually change the temperature control devices that input the set temperature to the thermostat, U.S. Pat. Nos. 4,459,159 and 4,456,169 issued to McGhee and McGhee et al. respectively (1985) disclose a thermostat control apparatus that uses an attached motor to mechanically change the temperature control knob settings in response to incoming and outgoing water temperature readings. Similarly, U.S. Pat. No. 4,413,775 issued to Scott (1983) discloses a device that automatically switches the thermostat temperature settings by means of a mechanical arm attached to the temperature control knob. Finally, U.S. Pat. No. 4,692,051 issued to Stansbury, Jr. et al.

(1987) discloses a cylindrically-shaped hot water heater knob adaptor that fits over most commercially available temperature control knobs found on residential hot water heaters.

With respect to devices that remotely program and or control the thermostat for a more energy-efficient regulation of water temperature in the tank, U.S. Pat. Nos. 4,016,402 and 4,413,775 issued to Scott (1977 and 1983) disclose a water heater control system that senses the temperature on the outflow line from the water heater and adjusts the thermostat setting based on periods of high or low demand as the case may be. U.S. Pat. No. 5,103,078 issued to Boykin et al. (1992) discloses a programmable hot water heater control device and method that allows the user to program into a control module a particular living cycle and assign a desired temperature to each of a predetermined number or heating start/stop times within that living cycle. U.S. Pat. No. 6,375,087 issued to Day et al. (2002) discloses an apparatus and method for self-programmable temperature and usage control for hot water heaters that allows the user to enter a plurality of selections for control functions based upon idle period start and end times, sleep periods, and vacation periods. U.S. Pat. No. 6,920,843 issued to Wilson (2005) discloses a programmable water heater having a programmable timer coupled to the water heater for establishing predetermined times as to when the water heater should operate. The programmable controller allows the operation of a solenoid valve which controls the flow of natural gas to the burner. U.S. Pat. No. 7,015,432 issued to Valbh (2006) discloses a water heater control system that can be programmed to go on and off at predetermined times and maintain temperatures below normal usage temperatures. The controller can also be programmed based upon usage history and it can be remotely controlled using a computer, wireless communications, or other such communications devices. Finally, U.S. Pat. No. 7,744,008 issued to Chapman, Jr. et al. (2010) discloses a programmable water heater control system that is married to the programmable HVAC control system.

With respect to devices that recirculate water from the pipe lines back into the hot water tank, U.S. Pat. No. 4,936,289 issued to Peterson (1990) discloses a usage responsive hot water recirculation system having a controller that automatically turns on a recirculating pump when there is a demand for hot water at any one or more usage points throughout the water supply system. U.S. Pat. No. 5,735,291 issued to Kaonohi (1998) discloses another hot water recirculating system having a (recirculating) water pump controlled by a timer/switch located at the hot water faucet.

These inventions show various levels of sophistication in design, function, and capabilities as they have evolved over time. They have become increasingly complex in design and operation while affording the user ever more options. While the field in which these inventions reside has obviously become more and more crowded, the prior art has yet to disclose a water heater control system that uses a remotely located computer to control both the hot water heater temperature settings and the recirculation system. Instead, the devices disclosed by the prior art focus on either remotely or locally controlling the temperature controls of only the hot water heater. In other words, the user is limited to controlling only the temperature of the hot water heater and that control is exercised at one location only; the user does not have the option of local or remote control of the temperature setting. The recirculation devices disclosed by the prior art typically rely upon control features at the (recirculating) pump or switches located at the demand point such as a faucet or shower head. Further, the water heater control devices disclosed by the prior art are only capable of use with either an electric water heater or a fuel-fired water heater, but not both. Accordingly, the design and operation of the devices found in the prior art give rise to certain limitations. Specifically and without limitation:

1. The water heater control devices disclosed by the prior art typically cannot be used with both an electric water heater and a fuel-fired water heater; they are typically restricted to use with one or the other.

2. The water heater control devices disclosed by the prior art can only control the thermostat set point by sending the thermostat an electric command signal changing the set temperature; typically, there is no provision for physically moving the temperature control knob.

3. The water heater control devices disclosed by the prior art do not interact with the hot water recirculation system.

4. The water heater control devices disclosed by the prior art do not contemplate an additional "on-demand" sensor that sends an activation signal to the heating elements immediately upon sensing a demand for hot water by the user.

5. The water heater control devices disclosed by the prior art having programmable commands typically receive commands through a land-line or hard-wired connection from the command source. In the alternative, they receive a wireless signal from a remote device similar to a TV remote control unit. None contemplate a local entry point where programmable commands can be manually entered at the site of the control unit in addition to the hard-wire and/or remote wireless option. Further none of the programmable devices disclosed by the prior art contemplated displaying the existing status of the system on a remote computing device such as a smart phone, notebook computer, or lap top computer. Further still, none of the programmable devices disclosed by the prior art contemplate receiving a command signal from a remote computing device such as a smart phone, notebook or laptop computer designed to send such programmable commands over the Internet.

6. The remotely signaled water heater control devices disclosed by the prior art are typically limited to electric water heaters.

7. The hot water recirculation systems disclosed by the prior art rely upon local switches near the recirculation pump or near a hot water fixture to activate the recirculation pump.

8. The hot water recirculation systems disclosed by the prior art do not interact or work in conjunction with the hot water heater temperature control system (thermostat). Similarly, they do not contemplate an additional "on-demand" sensor that sends an activation signal to the recirculation pump immediately upon sensing a demand for hot water by the user.

9. The devices disclosed by the prior art are typically limited to operations with residential hot water heaters as opposed to both residential and commercial hot water heaters.

10. The devices disclosed by the prior art typically cannot be retrofitted to operate with existing hot water heaters; instead, they must be installed as a component of a new water heater or water heater control system.

11. The devices disclosed by the prior art that can be retrofitted to operate with an existing water heater are exposed to the atmosphere making them susceptible to corrosion, contamination from dirt and dust, and accidental breakage.

12. The devices disclosed by the prior art have become increasingly more complex and difficult to operate which adds to their initial purchase price and increases the likelihood of breakage during use. Accordingly, these devices have not been commercialized to a point where they are in actual use by consumers.

13. The increasingly complexity of the devices disclosed by the prior art typically requires that they be factory-installed or installed by a plumber or electrician or both.

14. The devices disclosed by the prior art typically have only one power source rendering them inoperable during an electric power outage or after the battery power source is depleted.

15. The devices disclosed by the prior art typically require a service provider to disconnect the water supply to the water heater, water to the home/building, and/or power to the water heater prior to installation of the new device.

16. The devices disclosed by the prior art do not contemplate connecting to a business or residential wireless network 17. The devices disclosed by the prior art are typically individual parts/pieces or stand-alone components as opposed to an integrated operating system.

Objects and Advantages

The present invention seeks to overcome these shortcomings by providing a device to regulate the temperature of a hot water heater and the operation of a hot water recirculation pump and that is also: (a) backward-compatible with existing commercially available temperature control units; (b) enclosed in a waterproof and dustproof container so as to resist corrosion, contamination, and breakage; (c) responsive to locally and remotely generated programmable commands to regulate the temperature set point in the hot water heater (d) able to control the activation and deactivation of the recirculation pump; (e) responsive to an additional sensor, attached to the cold water inflow pipe, that senses a drop in water temperature in the cold water inflow pipe (sensing a demand for hot water from the user) and immediately activates the heating source and recirculation pump, (f) capable of installation by the user without outside professional assistance from a plumber or electrician or both; and (g) simple in construction, moderate in cost, and easy to use while still addressing the problems associated with the devices disclosed by the prior art. Accordingly, the objects and advantages of the present invention are:

(1) to provide a backward-compatible, remotely and locally programmable on-demand water heating unit and recirculation pump control unit ("Control Unit") that addresses and overcomes the problems associated with the devices disclosed by the prior art.

(2) to provide a Control Unit that can be used with either an electric water heater or a fuel-fired water heater.

(3) to provide a Control Unit that can control the thermostat by sending the thermostat an electrical command signal to change the set temperature and by sending the thermostat an electrical command signal to mechanically move the temperature control knob.

(4) to provide a Control Unit that controls both the process and timing of heating the water in a residential or commercial hot water heating system as well as the process of recirculating the heated water in a residential or commercial hot water recirculation system.

(5) to provide a Control Unit that uses local and remote switches and/or command consoles to regulate the temperature in a residential or commercial hot water heater and activate the recirculation pump in a residential or commercial hot water recirculation system.

(6) to provide a Control Unit that is compatible with other methods of regulating the temperature in a residential or commercial hot water heater and/or activating the recirculation pump in a residential or commercial hot water recirculation system.

(7) to provide a Control Unit that can be retrofitted to an existing residential or commercial electric or fuel-fired water heater temperature control unit by the user without the assistance or a plumber or electrician or both.

(8) to provide a Control Unit that contemplates the use of a primary power source and a back-up power source.

(9) to provide a Control Unit that is simple in design, easy and inexpensive to manufacture, manufactured with generally off-the-shelf materials, easy and safe to use, and commercially reasonable in price.

(10) to provide a Control Unit compatible for factory installation as well as retrofitting.

Additional objects, advantages, and novel features of the invention will be set forth in part of the description which follows and will become apparent to those skilled in the art upon examination of the following specification, or will be learned through the practice of the present invention.

DRAWINGS

Figure 4A:
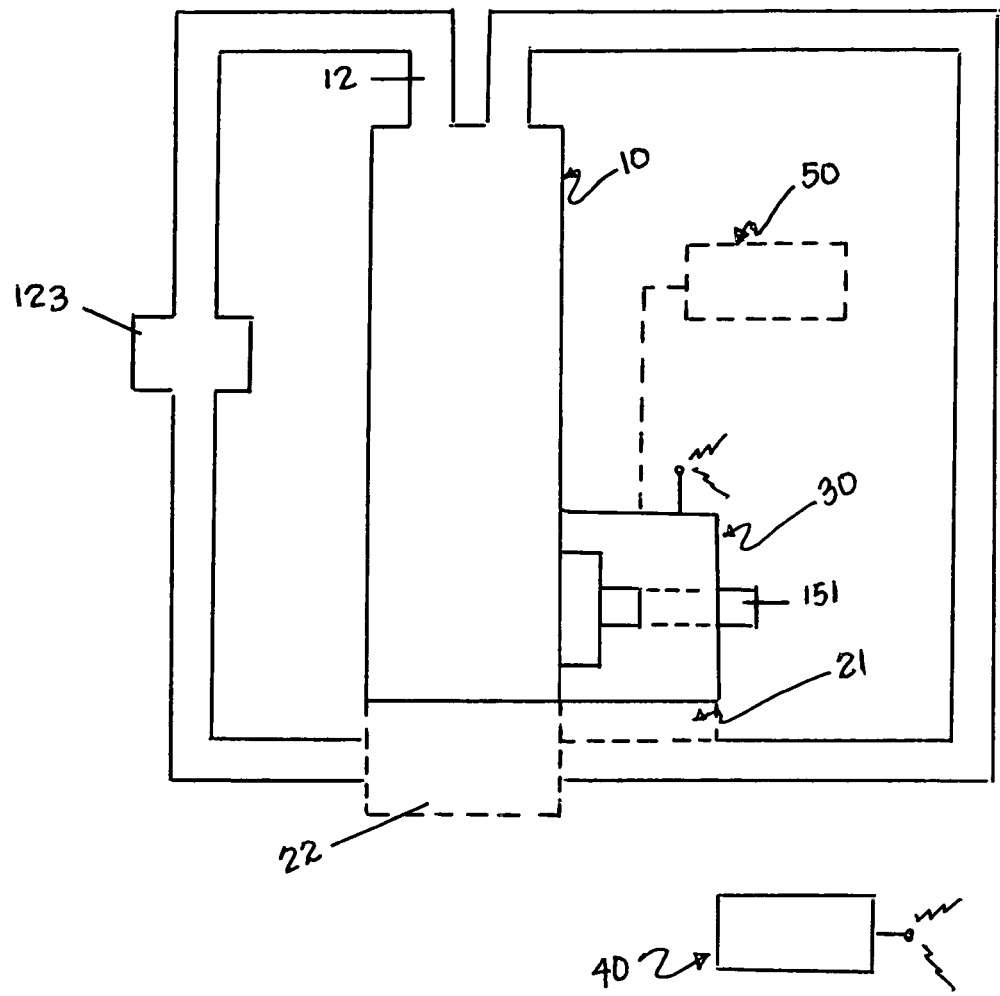
FIG. 4A is a schematic diagram of the present invention.
Figure 4B:
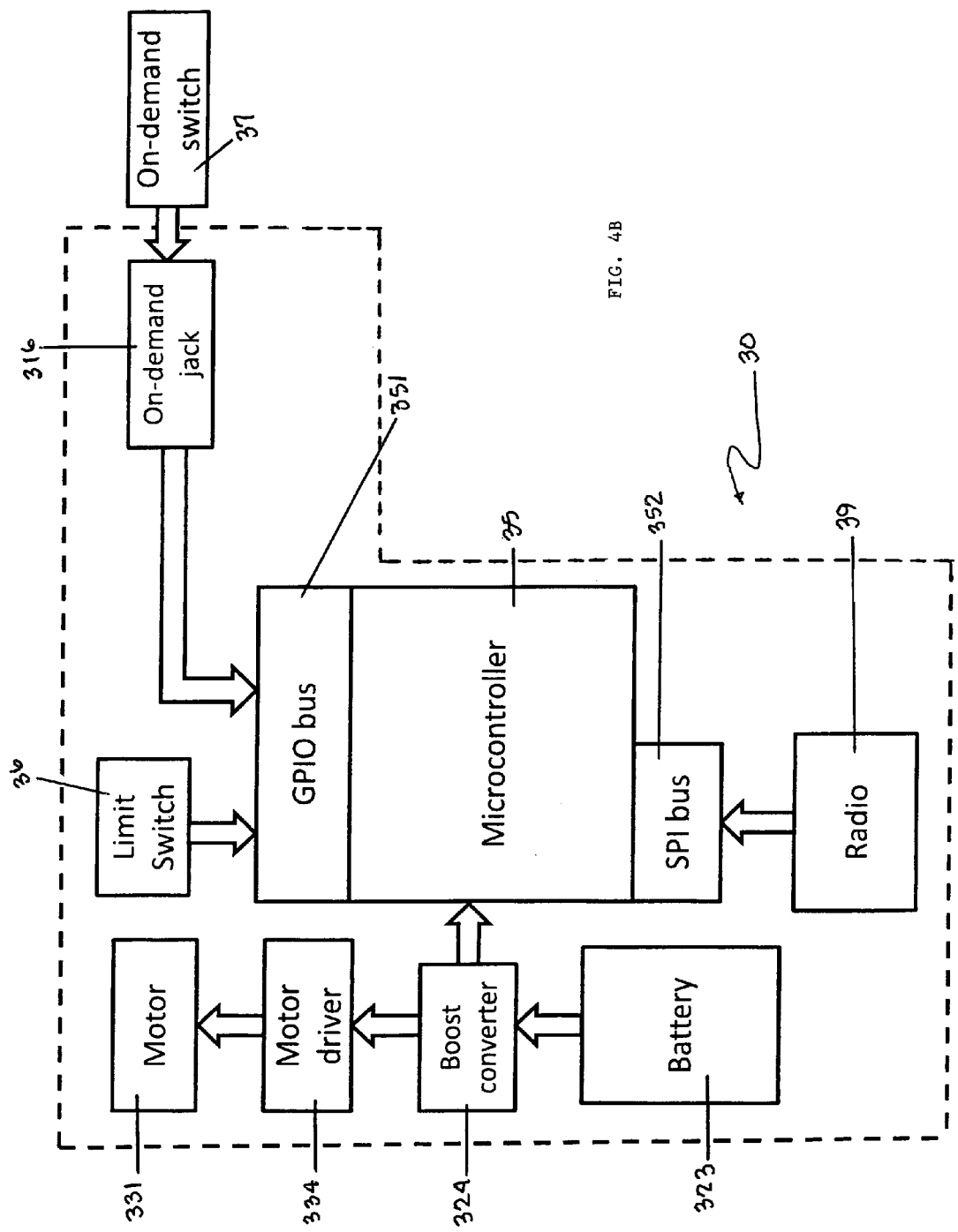
FIG. 4B is a schematic diagram of the Control Unit
Figure 4C:
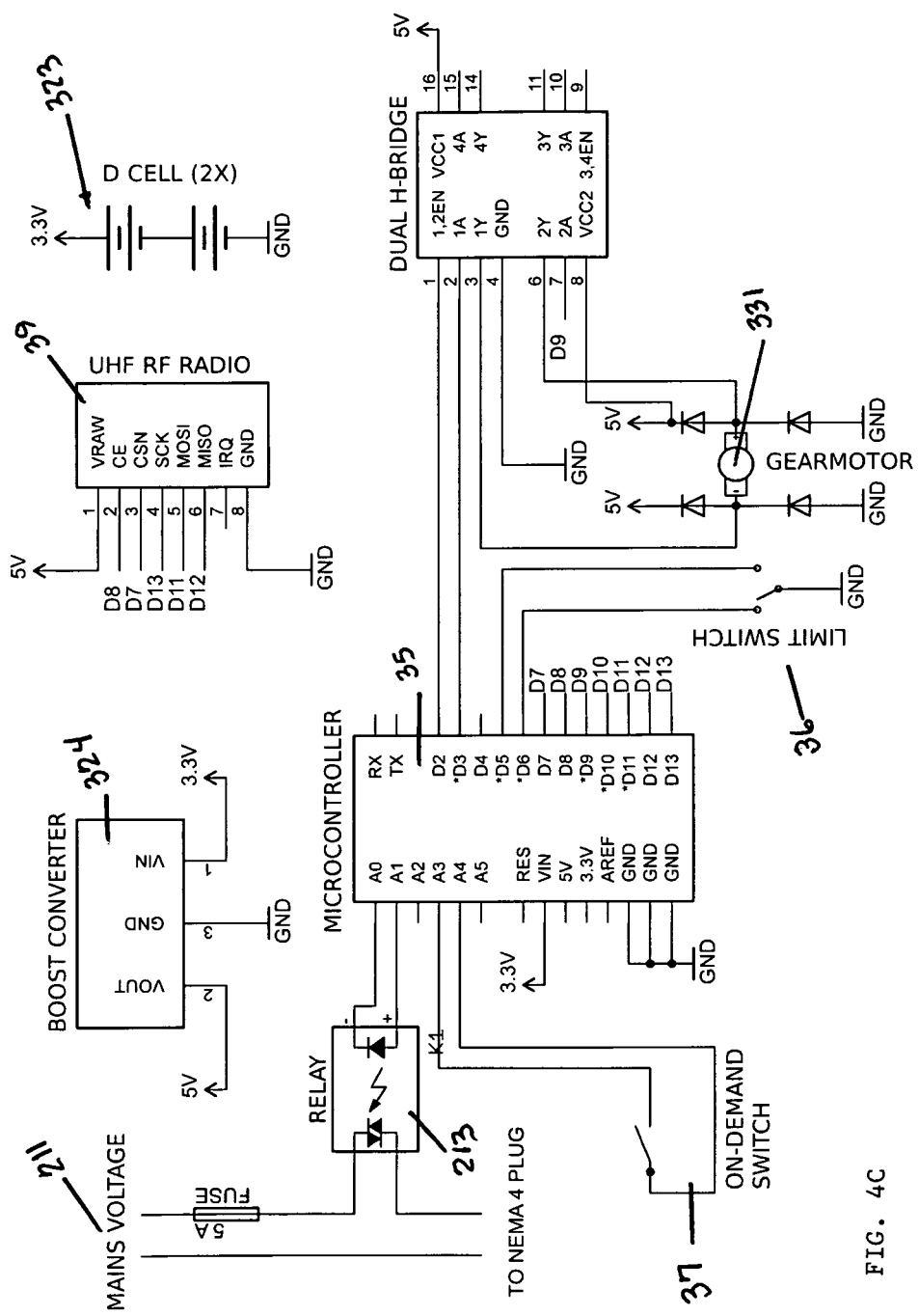
FIG. 4C is a circuit diagram of the Control Unit
Figure 4D:
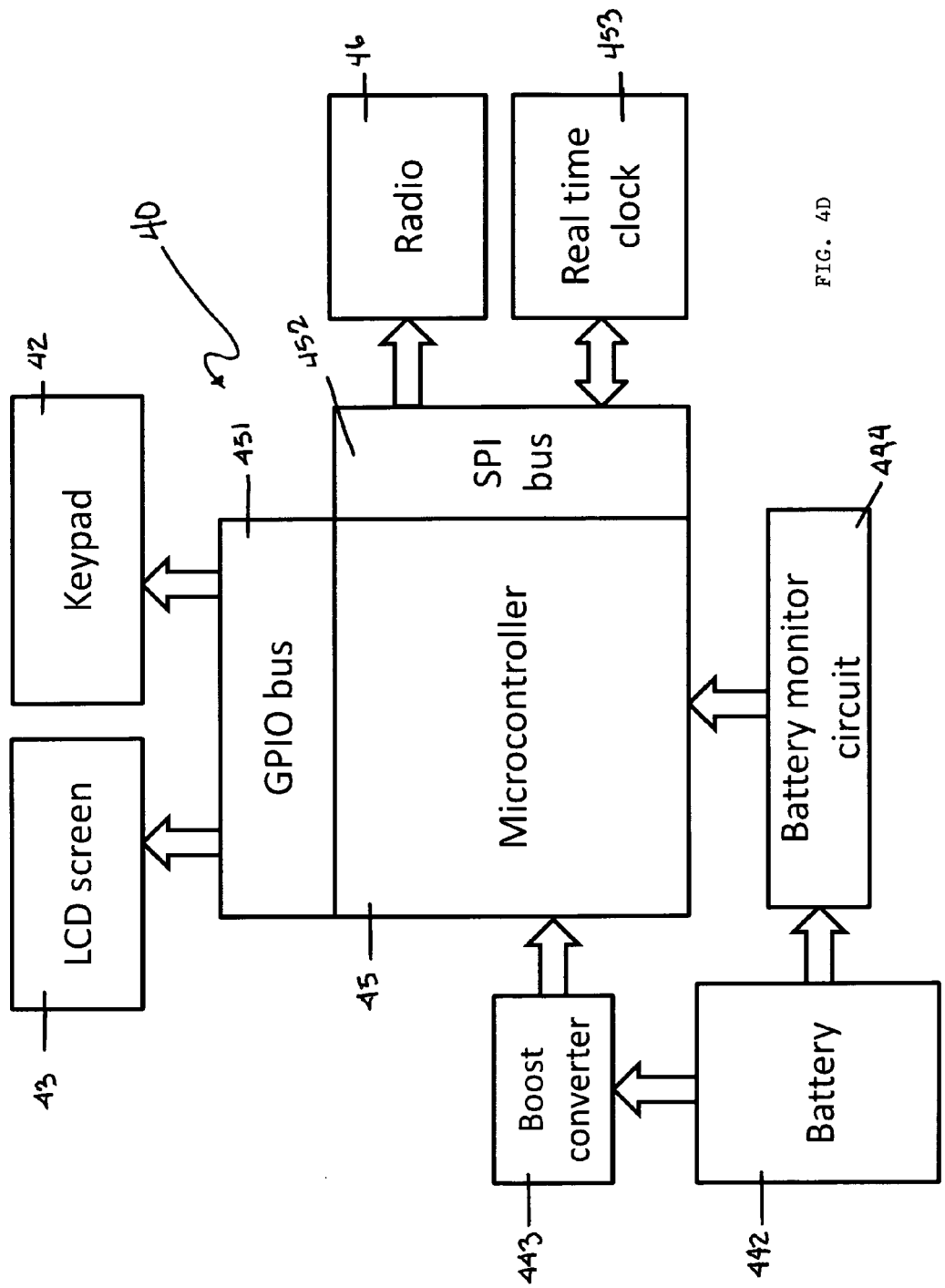
FIG. 4D is a schematic diagram of the (portable) remote command unit
Figure 4E:
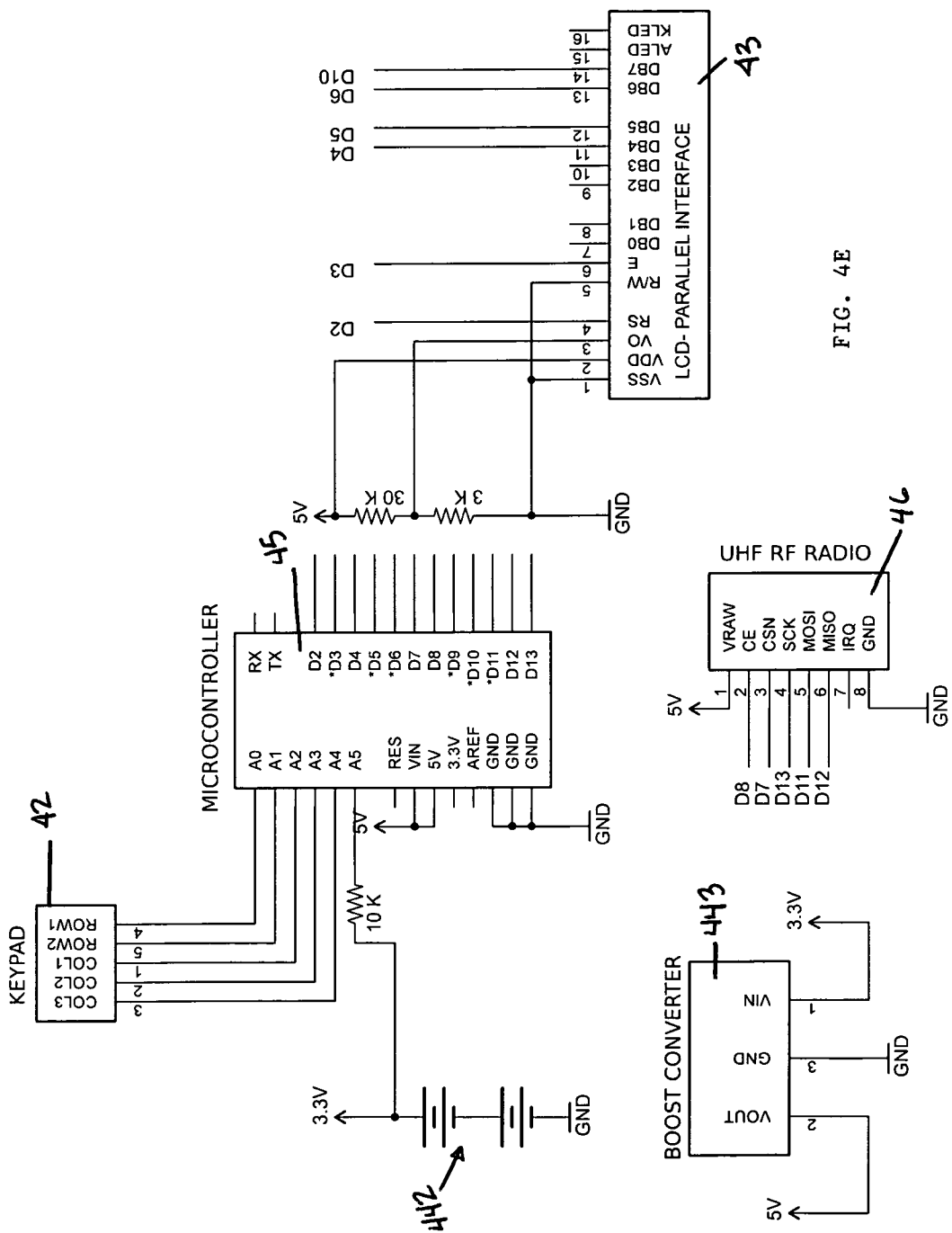
FIG. 4E is a circuit diagram of the (portable) remote command unit
Figure 4F:
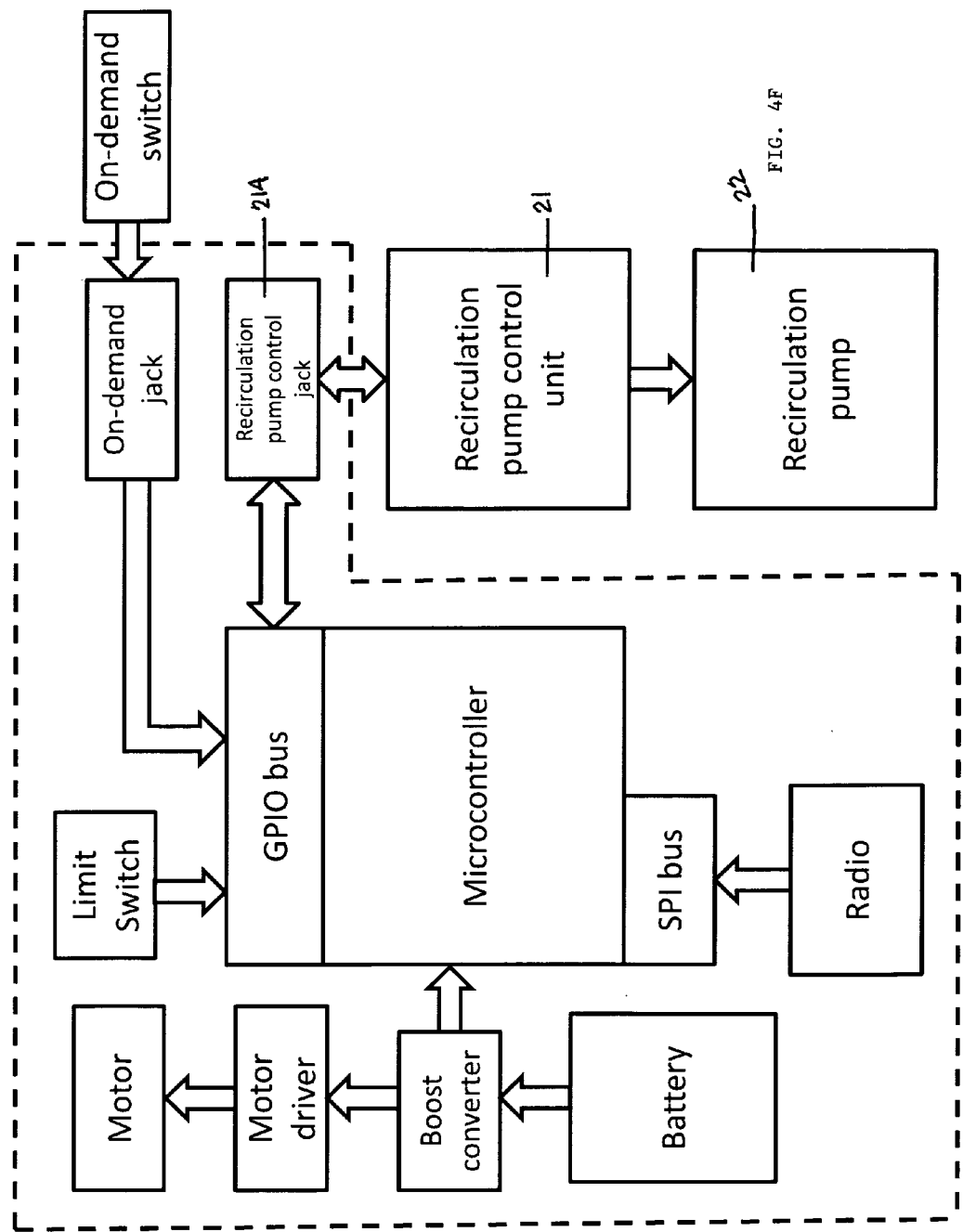
Figure 4G:
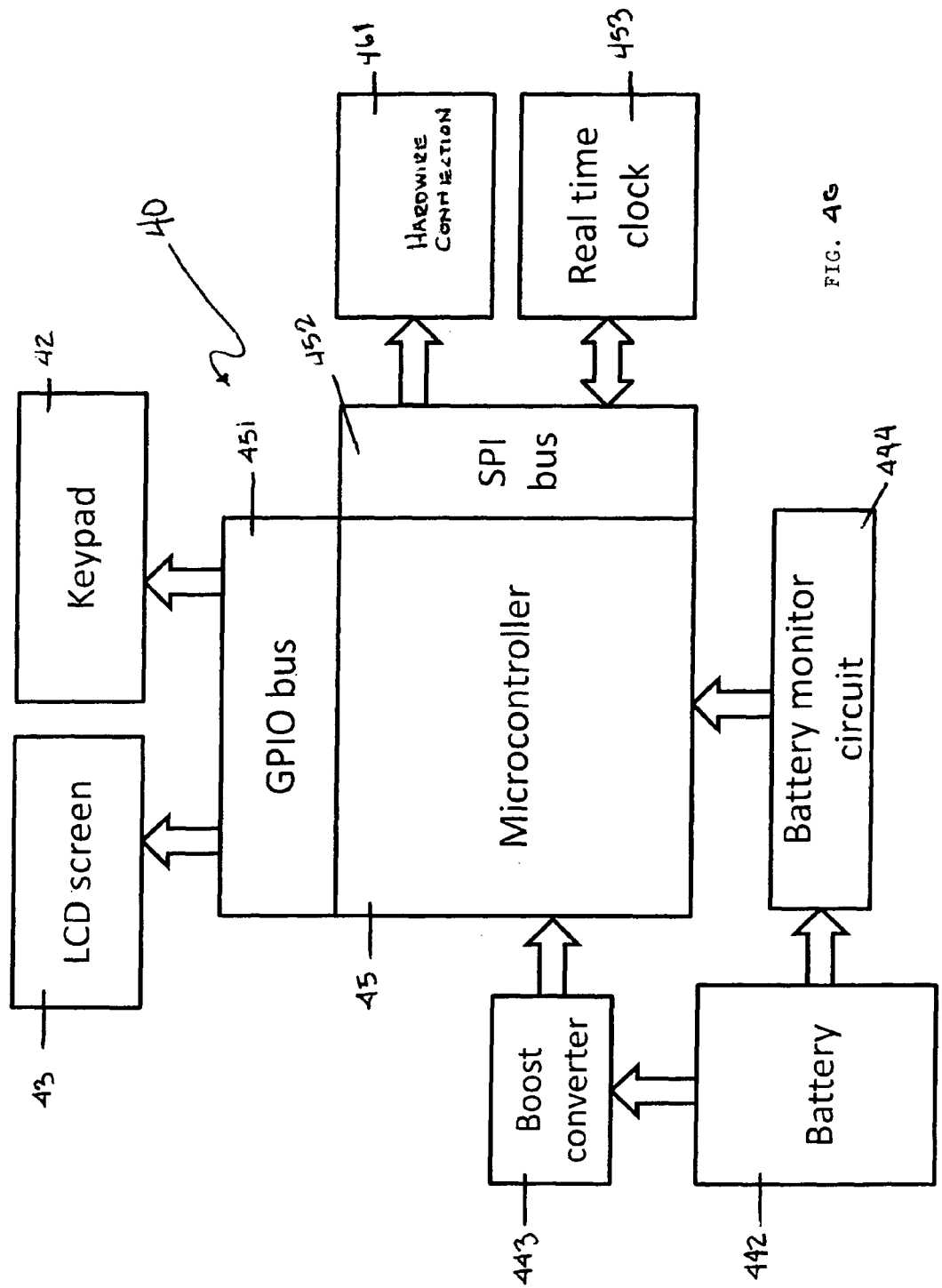
Figure 5A:
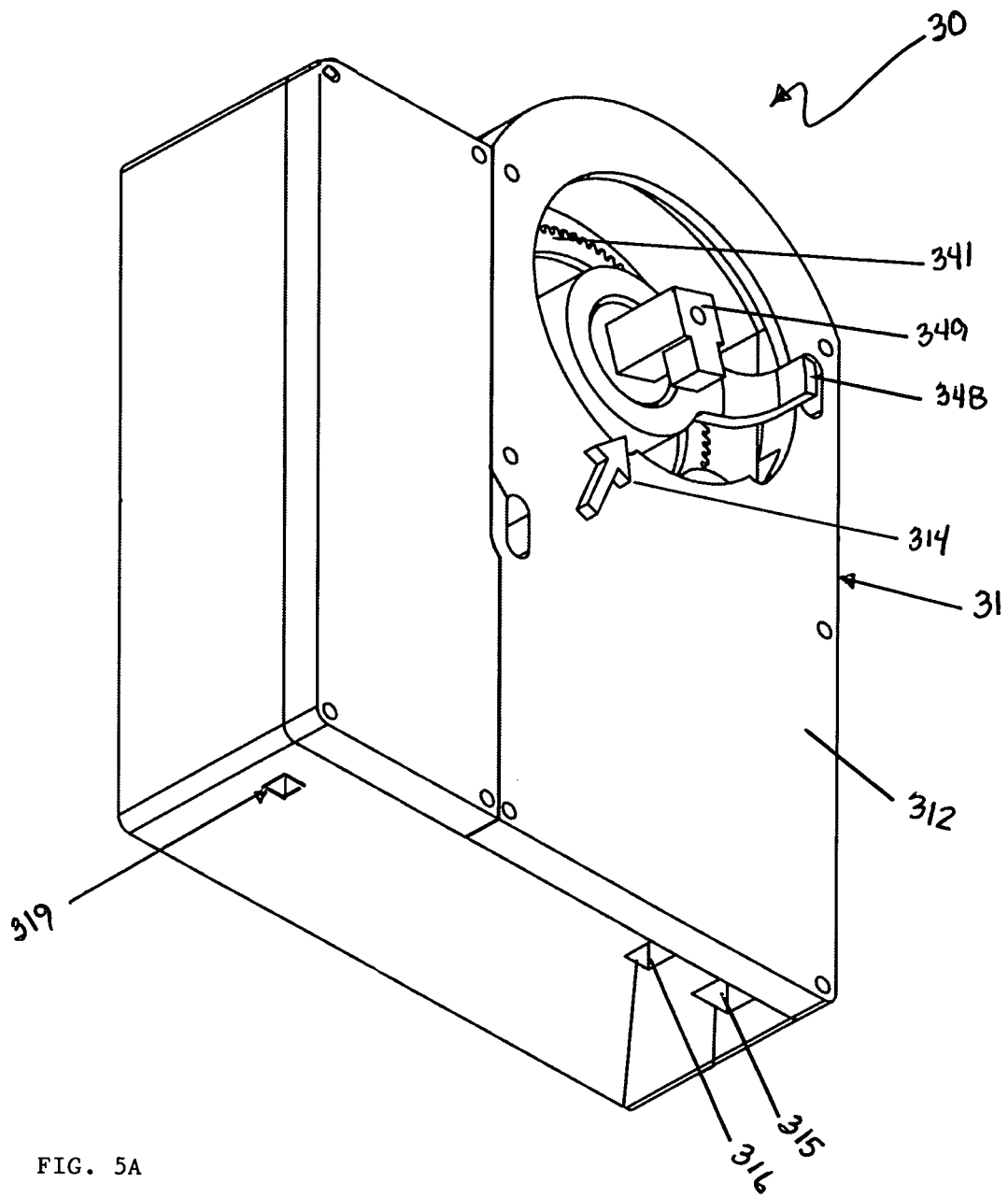
Figure 5B:
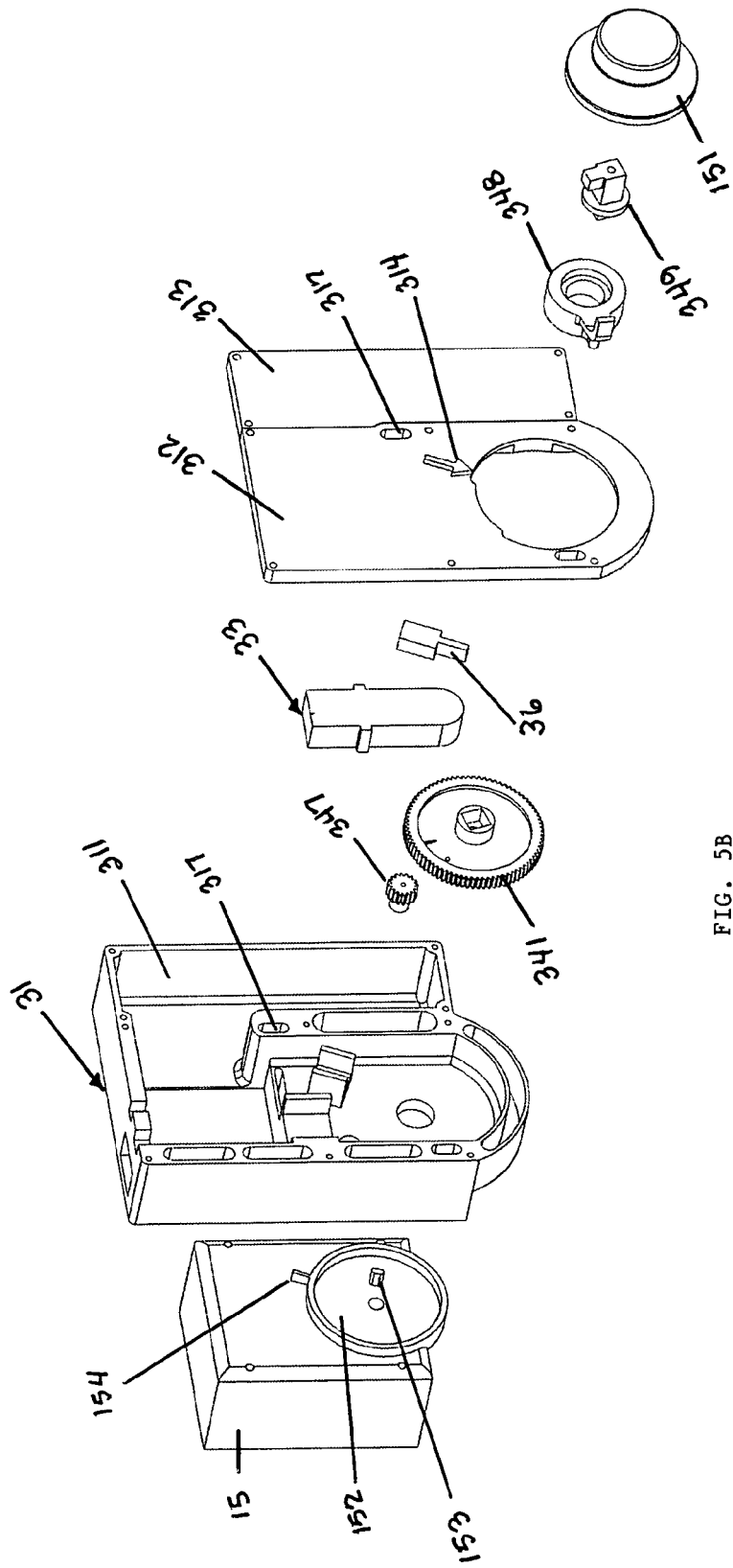
Figure 6A:
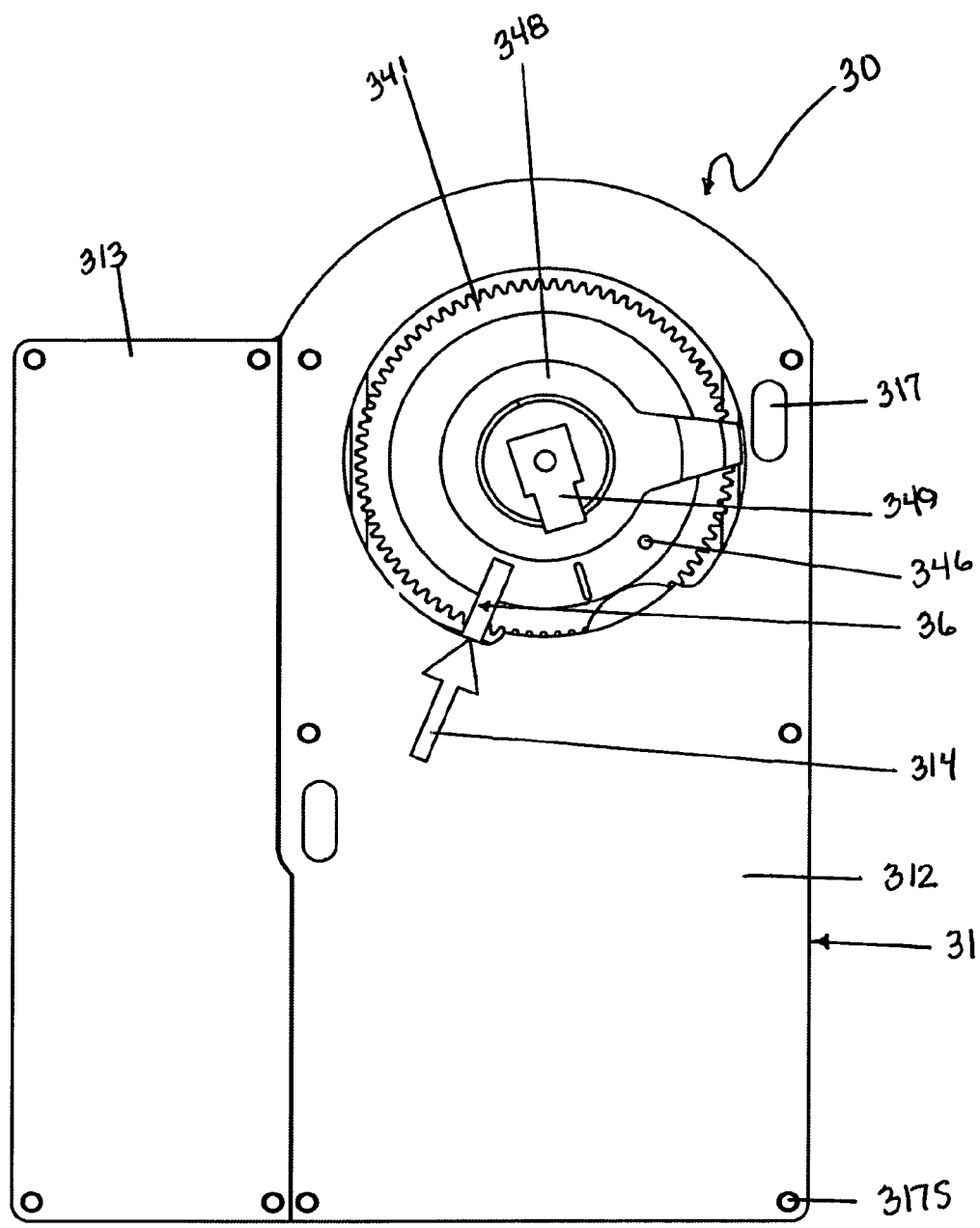
Figure 6B:
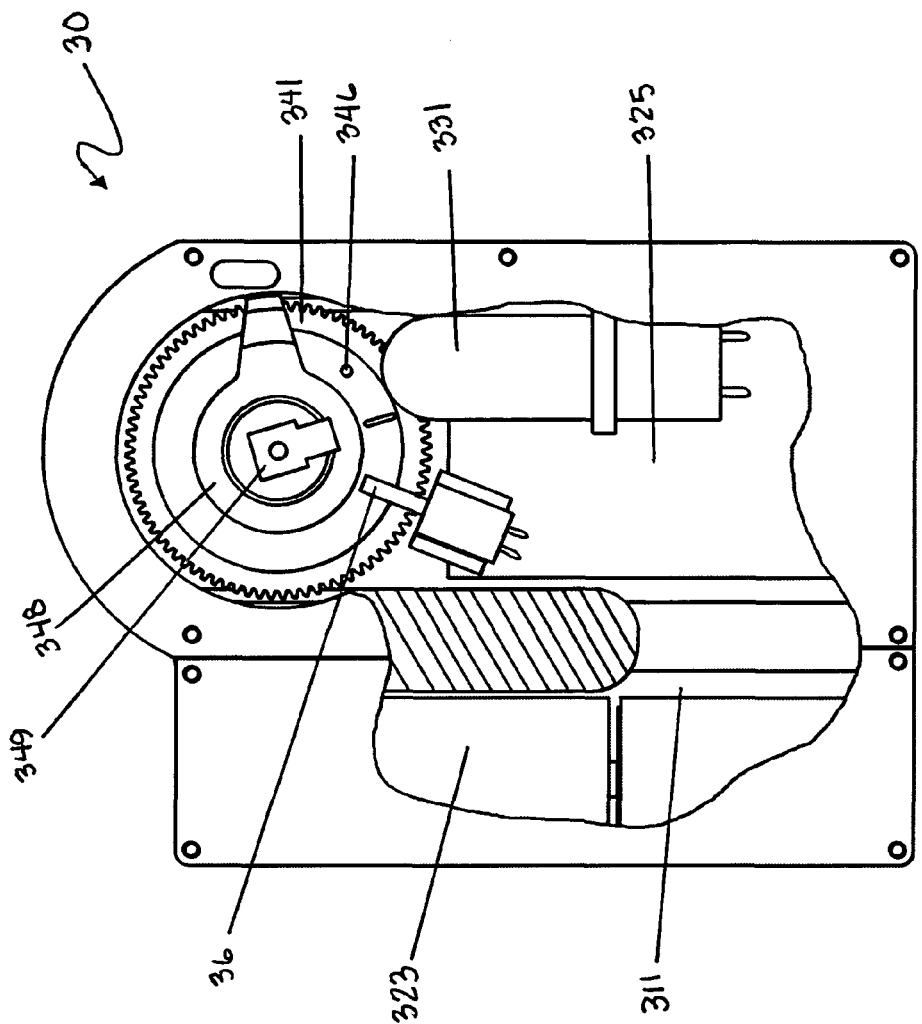
Figure 7:
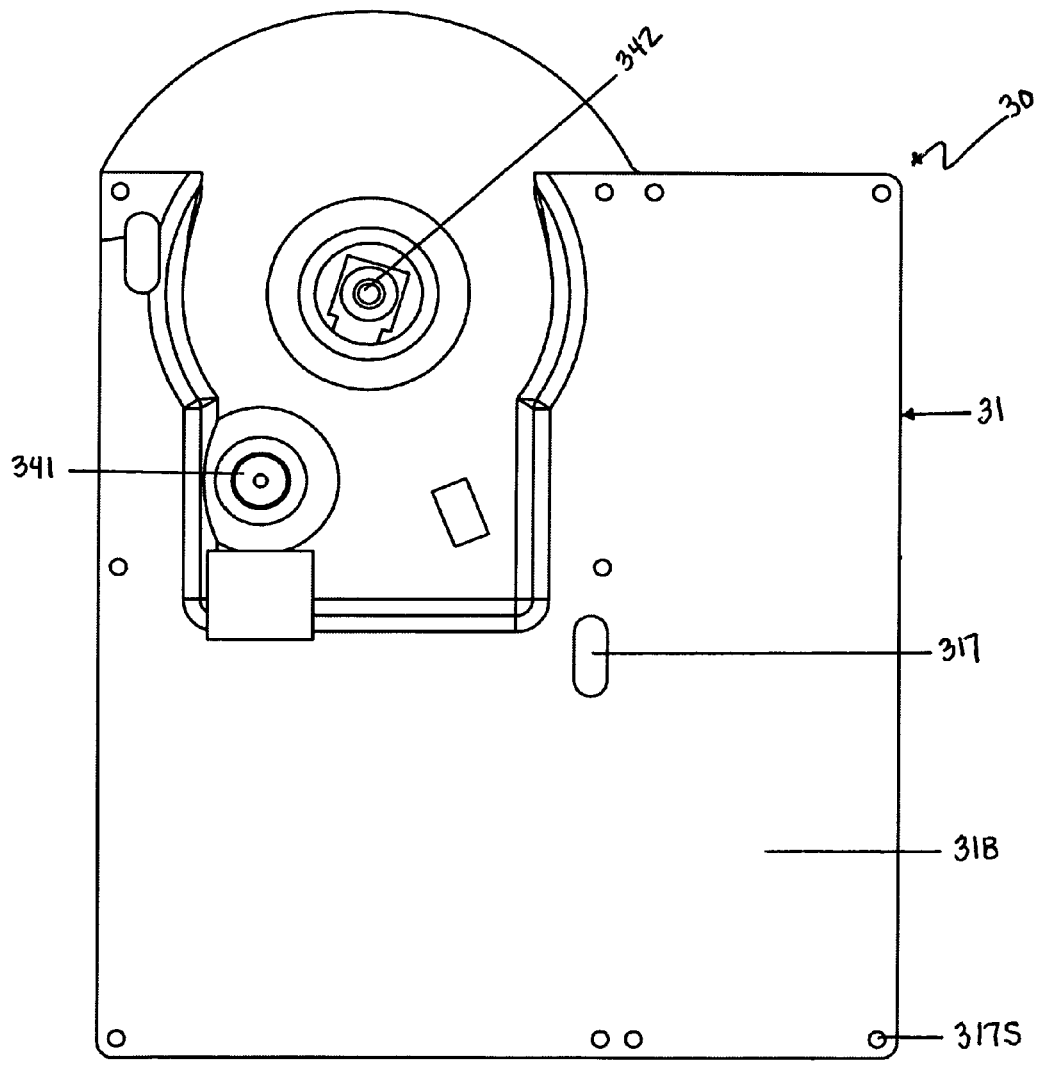
Figure 9:
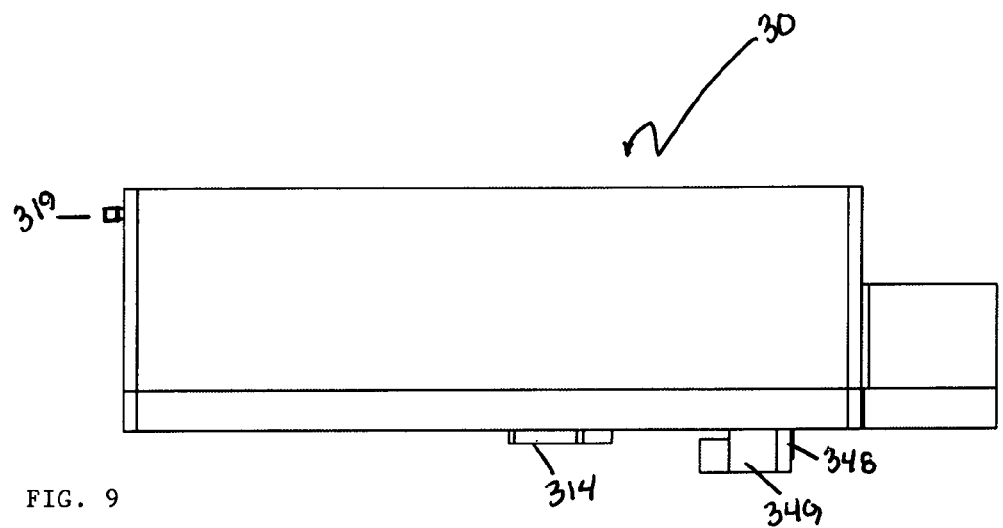
Figure 8:
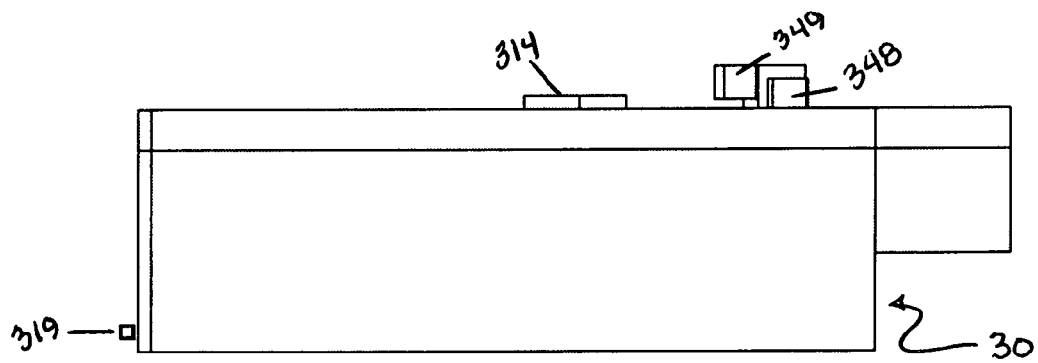
Figure 12:
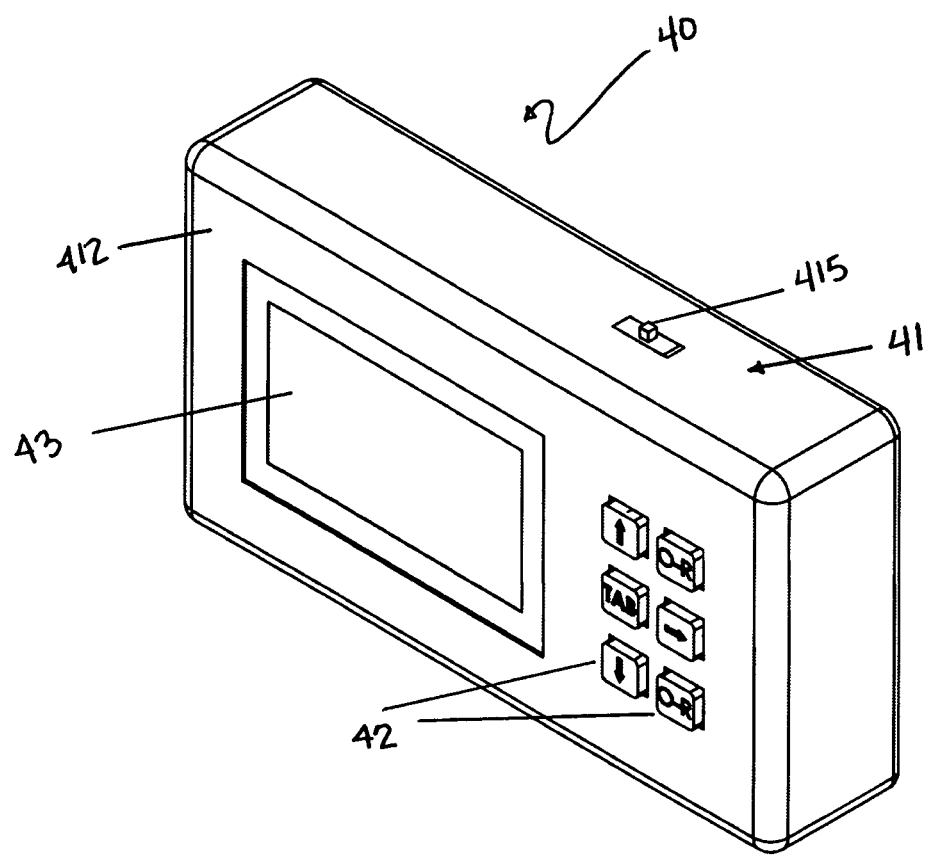
Figure 13A:
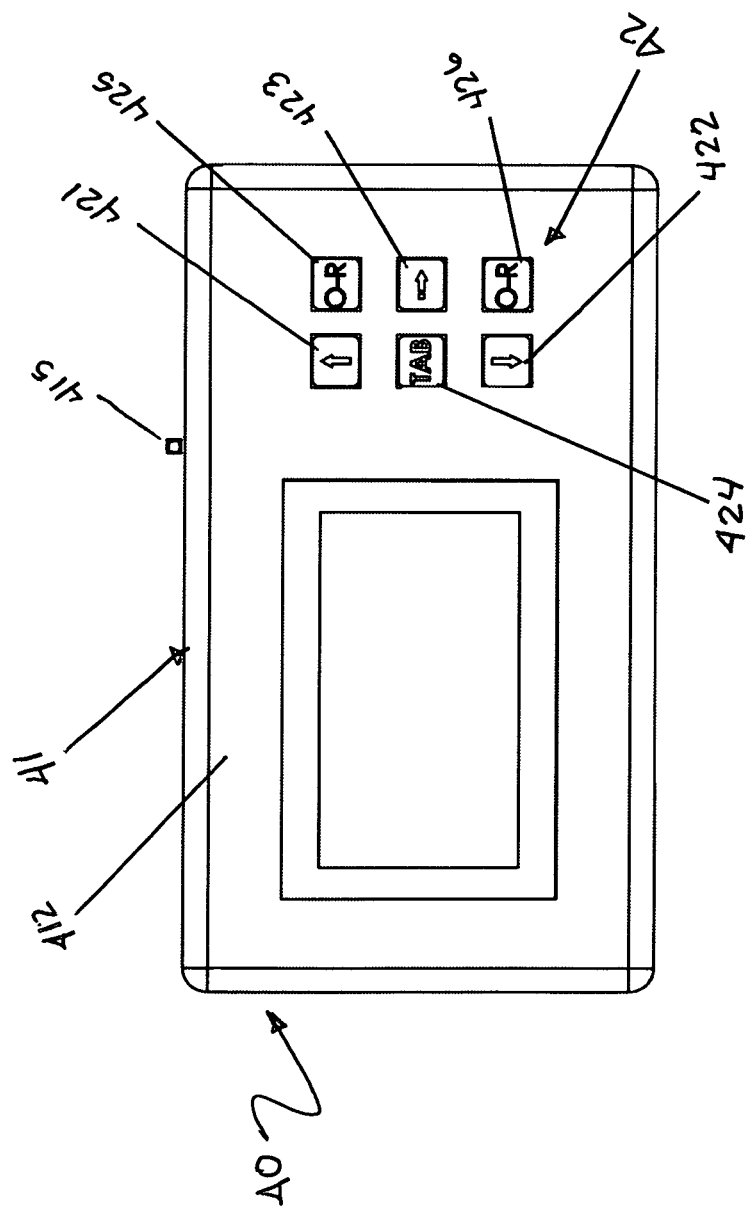
Figure 13B:
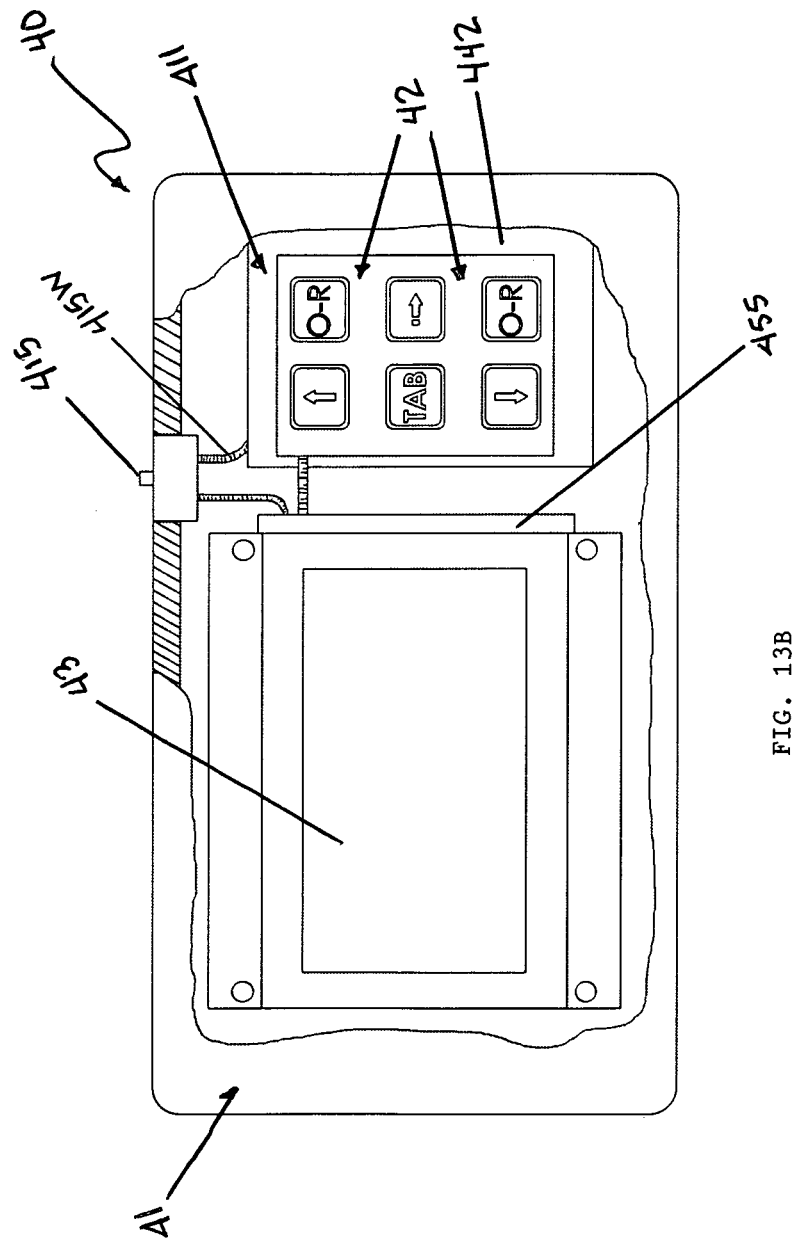
Figure 14A:
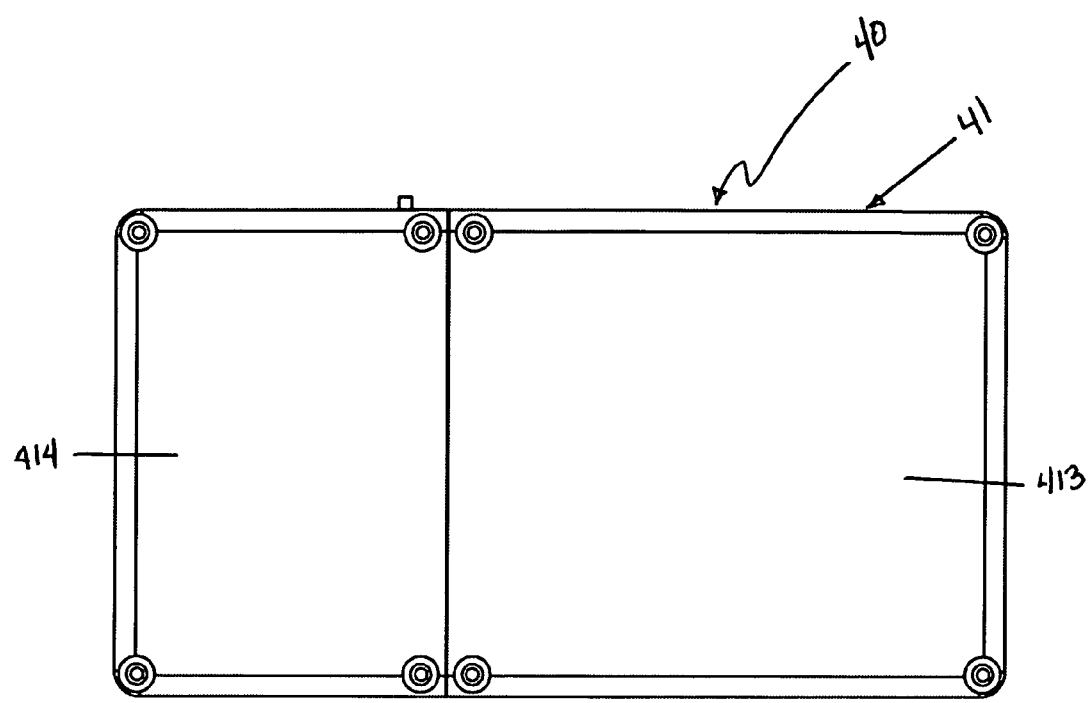
Figure 14B:
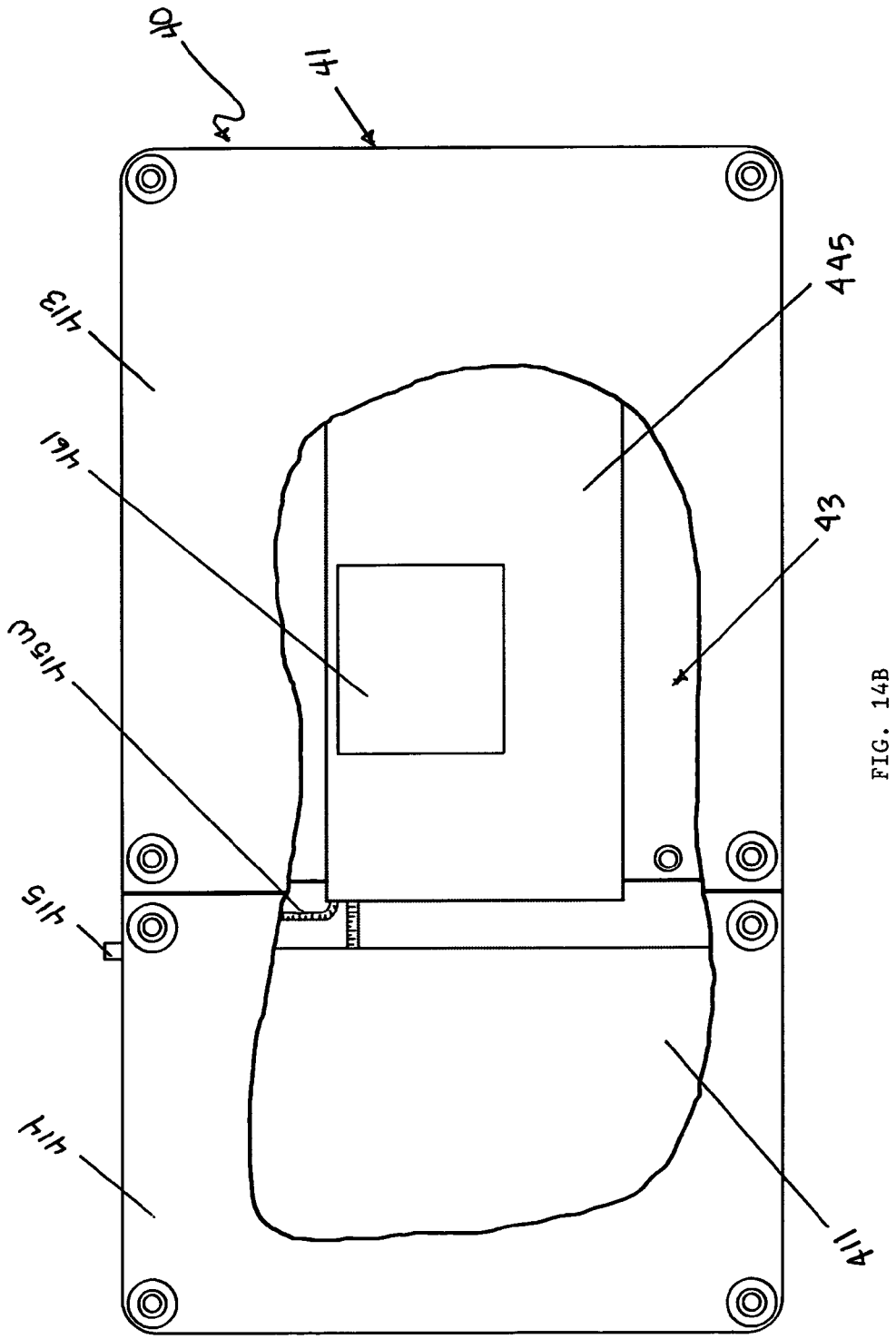
Figure 15:
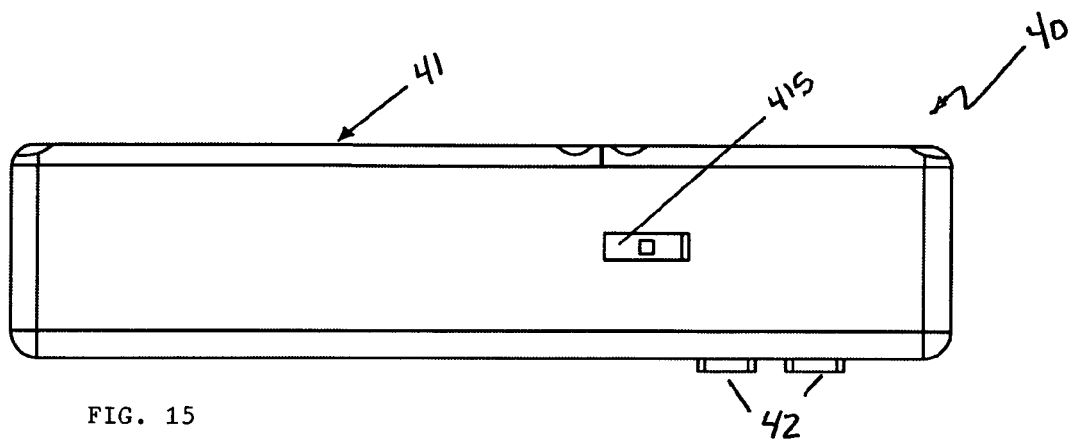
Figure 16:
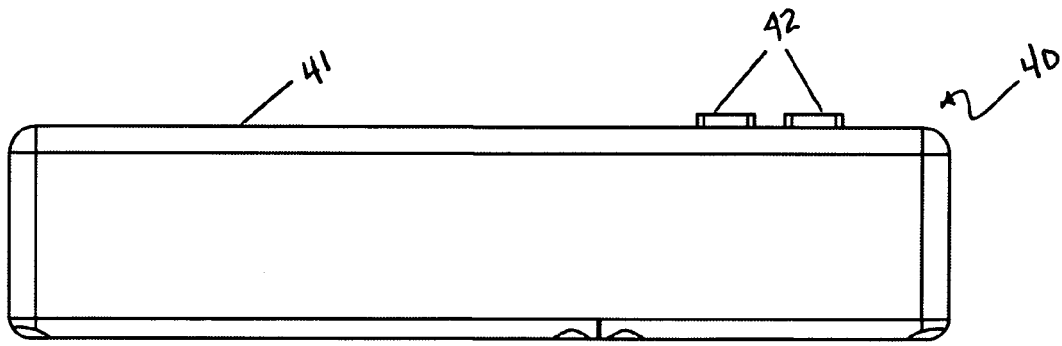

FIG. 4F is a schematic diagram of the control unit 30 the preferred embodiment of the present invention FIG. 4G is a schematic diagram of the (hard-wired) remote command unit FIG. 5A is a bottom-up left-front perspective view of the Control Unit FIG. 5B is an exploded view of the Control Unit FIG. 6A is a front elevation view of the Control Unit FIG. 6B is a cut-away front elevation view of the Control Unit FIG. 7 is a rear elevation view of the Control Unit FIG. 8 is a left-side elevation view of the Control Unit FIG. 9 is a right-side elevation view of the Control Unit FIG. 10 is a bottom-up plan view of the Control Unit FIG. 11 is a top-down plan view of the Control Unit FIG. 12 is a top-down right-front perspective view of the (portable) remote command unit FIG. 13A is a front elevation view of the (portable) remote command unit FIG. 13B is a cutaway front elevation view of the (portable) remote command unit FIG. 14A is a rear elevation view of the (portable) remote command unit FIG. 14B is a cutaway rear elevation view of the (portable) remote command unit FIG. 15 is a top-down plan view of the (portable) remote command unit FIG. 16 is a bottom-up plan view of the (portable) remote unit FIG. 17 is a right-side elevation view of the (portable) remote command unit FIG. 18 is a left-side elevation view of the (portable) remote command unit

DESCRIPTION OF THE INVENTION

Reference Numerals

10—Water Heater
11—Tank
111—Outer surface
112—Inner surface
12—Inlet Conduit
121—Inlet Control Valve
122—Water Flow Detection Sensor
123—On-demand sensor
123A—Remote sensor
124—On demand sensor signal wire
124A—Remote sensor signal wire
13—Outlet Conduit
14—Thermostat
15—Temperature Adjustment Control ("TAC") Unit
151—TAC Knob
152—Temperature set point control
153—Temperature set point control shaft
154—Temperature set point alignment mark
16—Heat Source
161—Electric Heating Element
162—Burner Jet
163—Fuel Line
17—Drip Pan
171—Wire Sensor
172—Drip Pan Signal Transmission Line
20—Recirculation System
21—Recirc system control unit
211—Main power source
212—Internal power supply
213—Relay
214—Recirculation pump control jack
215—Relay control line
216—Relay output portal
217—Remote signal receiver
22—Recirculation Pump
221—Electric Power Switch Starter
222—Recirc Pump Thermostatic Starter (not shown)
223—Recirc Pump Timer-Starter (not shown)
224—Recirc Pump Motion Sensor Starter (not shown)
225—Recirculation pump motor
23—Recirculation Lines
24—Supply Pipe
25—Fixture
30—Backward Compatible, Programmable, and On-Demand Water Heater and Recirculation Pump Control Unit ("Control Unit")
31—Main Case
311—Battery Tray
312—Main Case Face Plate
313—Battery Tray Face Plate
314—Main Case Pointer Arrow
315—Recirculation Pump Jack
316—On-demand Switch Jack
317—Mounting Hole
317S—Screw Hole
318—Main Case Bottom
319—Control Unit On-off Switch
32—Power Unit
321—Circulation Pump Controller
323—Battery
324—Boost Converter
325—Circuit Board
33—Motor Control Unit
331—Motor
332—Gearbox
333—Output Gear
334—Motor Driver
34—Drive Unit
341—Main Gear
342—Main Gear Mating Spline
346—Low Stop Pin
347—Pinion
348—High Stop
349—Beak
35—Microcontroller
351—GPIO Bus
352—SPI Bus
353—Control Booster
36—Limit Switch
37—On-demand Switch
39—Control Unit Radio
40—Remote Command Signal Computer and Control Unit ("Remote Unit")
401—Personal Communication Device Control Unit
41—Remote Case
411—Battery Tray
412—Remote Case Face Plate
413—Remote Case Back Plate
414—Remote Case Battery Tray Back Plate
415—Remote On-off Switch
415W—Wire
42—Keypad
421—Up Key
422—Down Key
423—Next Screen Key
424—Enter Key
425—Override Hot Key
426—Override Cold Key
43—LCD Screen
44—Power Source
442—Battery
443—Boost Converter
444—Battery Monitor Circuit
45—Microcontroller
451—GPIO Bus
452—SPI Bus
453—Real-time Clock
455—Circuit Board
46—Command Signal Radio Transmitter
461—Command Signal Hardwire Transmission Line
47—Recording Device
50—Hardwired Command Signal Control Station ("CCS")
501—Personal Computer CCS
51—Case
511—Keypad
512—LCD Screen
52—Microcontroller
521—GPIO Bus
522—SPI Bus
523—Circuit Board
53—Power source
54—Real-time Clock Unit
55—Command Signal Transmission Lines
56—Output Portal
561—Output Portal to Control Unit
562—Output Portal to Recirc Pump Control System
563—Output portal to On-Demand Sensor
57—Recording Device

Description of the Simplest Embodiment of the Invention

Figure 1:
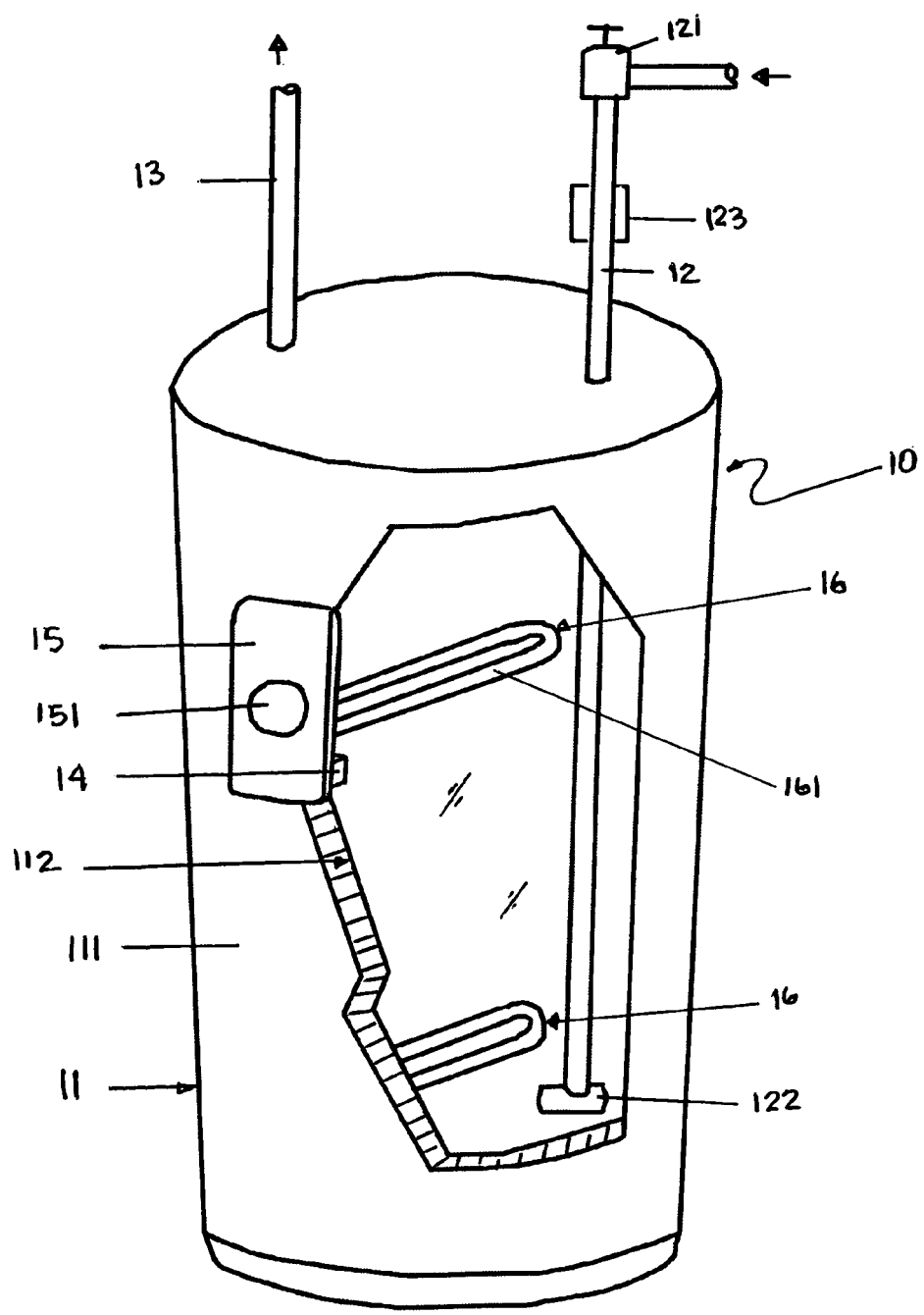
FIG. 1 is a cut-away perspective view of a generic electric hot water.
Figure 2:
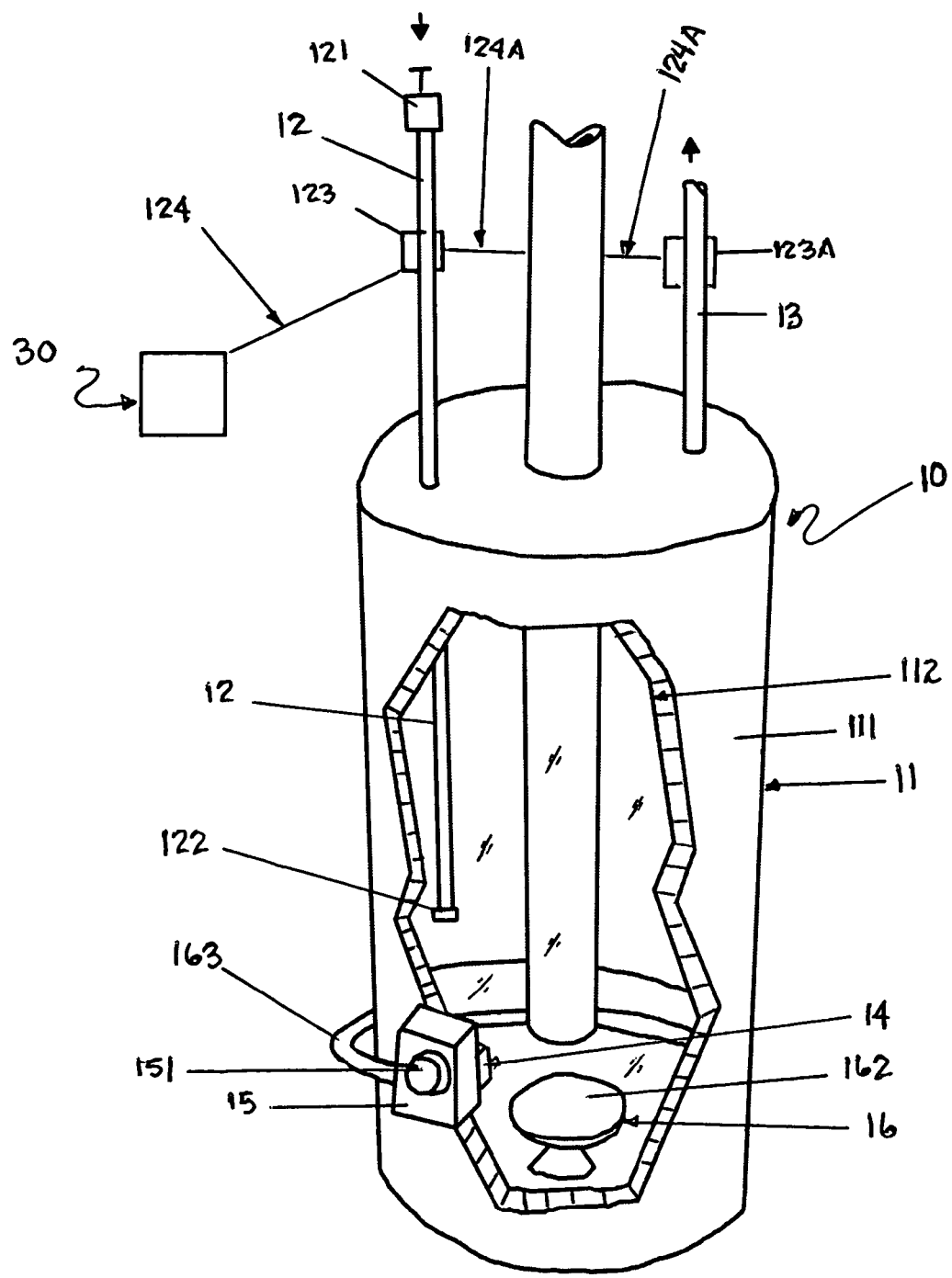
FIG. 2 is a cut-away perspective view of a generic fuel-fired hot water heater.
Figure 3A:
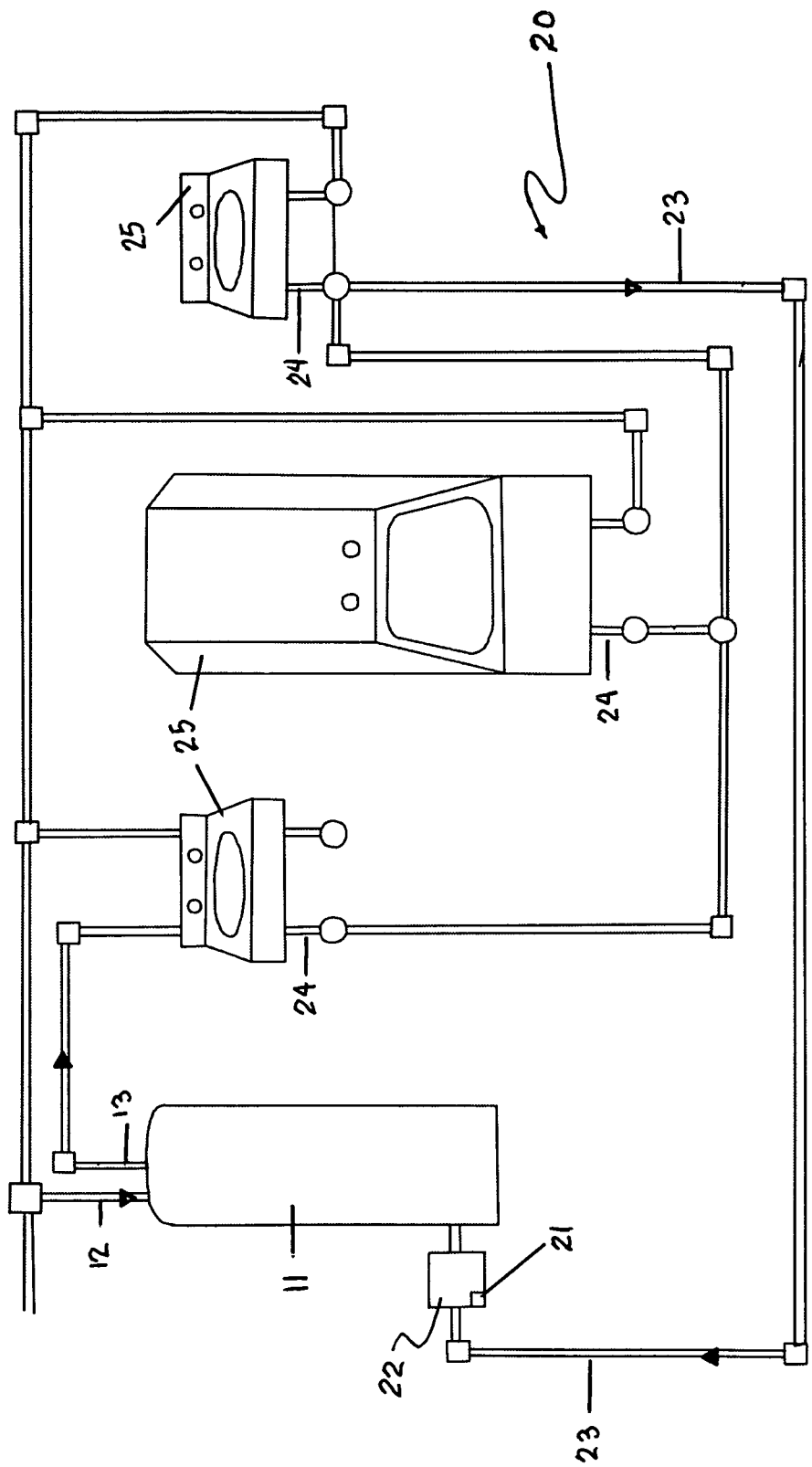
FIG. 3A is a schematic diagram of a typical residential or commercial hot-water recirculation system.

FIGS. 1 and 2 are cut-away perspective views of typical electric (FIG. 1) and fuel-fired (FIG. 2) hot water heaters 10 which are connected to a typical residential or commercial hot water and recirculation system 20 as shown schematically in FIGS. 3A and 4A. Looking more closely at FIGS. 1 and 2, the water heater 10 consists of tank 11 for heating and storing water for residential or commercial use. The hot water tank 11 is receives cold water through an inlet conduit 12 and deliver heated water to the residential or commercial structure through an outlet conduit 13. The inlet conduit 12 typically has an inlet control valve 121 mounted thereon to provide a means of shutting off the water flow to the tank 11 as desired. The inlet conduit 12 also has some type of water flow detection device 122 or sensor positioned inside the tank 11 to detect the movement of cold water into the tank 11. The tank 11 has a thermostat 14 mounted on its inner surface 112. Whether the hot water heater 10 uses electricity or fossil fuel (fuel oil or natural gas) as an energy source, it still needs a thermostat 14 to monitor the temperature of the water inside the hot water tank 11. The tank 11 also has a temperature adjustment and control ("TAC") unit 15 mounted on its outer surface 111. On an electric water heater 10, this TAC unit 15 is typically connected electrically to the thermostat 14 so that it can transmit "temperature set point" commands to the thermostat 14. The fossil fuel powered heater 10 has a TAC knob 151 is mounted on the TAC 15 to manually adjust temperature set points on the thermostat 14. The present invention contemplates remote communication links to devices controlling the TAC unit 15 and the thermostat 14 so that these "temperature set point" commands can be transmitted to the TAC unit 15 remotely. These links include, without limitation, wireless signals, electric signals transmitted through a land line, computer generated signals, mobile communication device generated signals, voice-activated commands, and the like.

The thermostat 14 is connected to a heat source 16 which provides the energy necessary to heat (or reheat) the water in the tank 11. The heat source 16 on an electric water heater 10 typically consists of one or more high electrical resistance metal heating elements 161 protruding horizontally from the inner surface 112 of the tank 11. The heat source 16 on a fuel-fired water heater 10 is typically a circular burner jet 162 located underneath the tank 11 and supplied with propane, natural gas, or fuel-oil through the fuel line 163.

The temperature adjustment and control ("TAC") unit 15 on an electric water heater 10 is electrically connected to the thermostat 14 which permits it to change the temperature settings that activate the heating elements 161. The TAC unit 15 on a fuel-fired water heater 10 mechanically changes the temperature set point of the thermostat 14. This permits the user to manually change the temperature settings that activate the burner jets 162 by simply turning the TAC knob 151 right or left to the desired setting.

The present invention has an on-demand sensor 123 attached to the outside of the cold water inlet conduit 12. This on-demand sensor 123 will sense a negative temperature change in the inlet conduit 12 that is brought about by the surge of cold water through the inlet pipe 12 incident to any demand for hot water on the part of the user such as turning on a hot water faucet or initiating operation of a washing machine or dishwasher. The remote sensor 123 is electrically connected to the control unit 30 (the control unit 30 is depicted schematically in FIG. 2) by means of the on-demand sensor signal wire 124. The remote sensor 123 transmits the temperature differential signal to the control unit 30 which (as explained in more detail below) receives the signal, interprets that signal as a demand for hot water and processes that signal accordingly.

The on-demand sensor 123 can also be configured to sense a predetermined temperature differential between the water temperature in the inlet conduit 12 and that of the water in the outlet conduit 13. The temperature of the water in the outlet conduit 13 would be measure by a remote sensor 123A attached to the outside of the hot water outlet conduit 13 and electrically connected by another signal wire 124A to the on-demand sensor 123 on the inlet conduit 12. In this configuration, the on-demand sensor 123 would sense a difference in temperature between the water in the two conduits 12, 13. When the temperature difference reaches a predetermined level, again brought about by any demand for hot water on the part of the user, the on-demand sensor 123 transmits that temperature differential signal to the control unit 30 which (as explained in more detail below) receives the signal, interprets that signal as a demand for hot water and processes that signal accordingly.

Figure 3B:
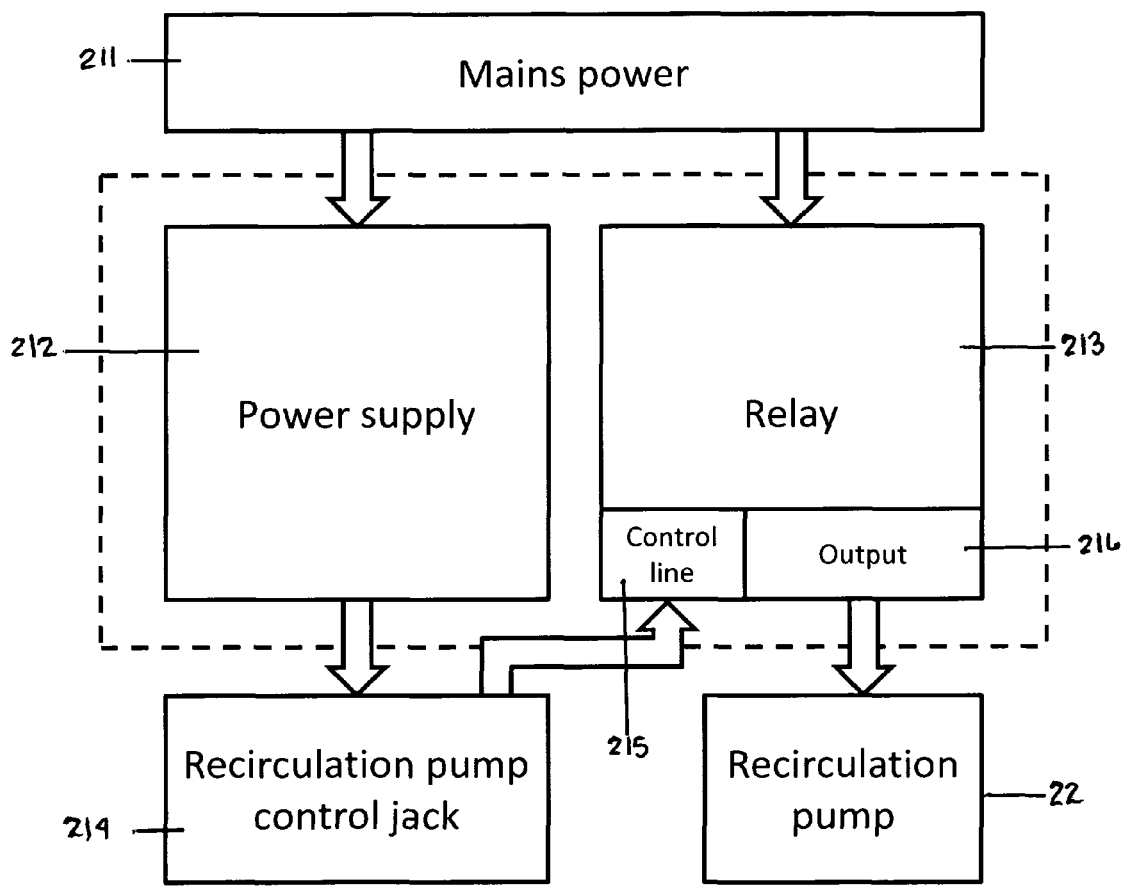
FIG. 3B is a schematic diagram of the recirculation pump control unit

FIG. 3A is a schematic diagram of a typical residential or commercial hot water recirculation system 20. FIG. 3B is a schematic diagram of the recirculation pump control unit 21. FIG. 4A is a schematic diagram of the preferred embodiment of present invention. The preferred embodiment contemplates control of the hot water heater 10 as well as the hot water recirculation system 20 (as appropriate). This preferred embodiment is discussed below following the descriptions of the simplest embodiments.

Referring again to FIG. 4A, it is a schematic diagram of the present invention showing its major components. A remote command signal computer and control unit 40 ("remote unit") sends command signals to a control unit 30 which is connected to a typical residential or commercial hot water heater 10. On another embodiment, a hard-wired command signal computer/control station 50 ("CCS") also sends command signals to the control unit 30. The control unit 30 also receives temperature differential signals from a remote sensor 123 attached to the outside of the cold water inlet pipe 12 found on the hot water heater 10. Finally (as found in the description of the preferred embodiment) the control unit 30 sends command signals to a recirc system control unit 21 to activate a recirculation pump 22 found on a typical residential or commercial hot water recirculation system 20.

The control unit 30 is fixably attached (mounted over) to the TAC 15 found on the hot water heater 10 and receives command and control signals by wireless communication from the remote unit 40 or land line signals from the CCS 50. After receiving and processing these signals from the remote unit 40 or the CCS 50, the control unit 30 sends operating commands to the hot water heater 10 (and the recirculation system 20). The control unit 30 can also receive a temperature differential signal from the on-demand sensor 123 via the on-demand sensor signal wire 124. The control unit 30 processes this signal and then sends operating commands to the hot water heater 10 (and the recirculation system 20).

FIG. 4B is a schematic diagram of the control unit 30 while FIG. 4C is a circuit diagram of the control unit 30. FIG. 4D is a schematic diagram of the remote unit 40 while FIG. 4E is a circuit diagram of the remote unit 40. FIG. 4F is a schematic diagram of the control unit 30 for the preferred embodiment of the present invention. FIG. 4G is a schematic diagram of the CCS 50.

FIG. 4B is a schematic diagram of the simplest embodiment of the control unit 30 and shows its major operational components. The battery 323 is typically the main power source for the control unit 30. One alternative embodiment of the present invention contemplates the use of solar panels as a power source to charge the batteries 323. Another embodiment contemplates the use of standard commercially available electricity as a power source. In the electric-powered configuration, the current would be the main power source to the control unit 30. It would also charge the batteries 323 which could be used in the case of a power failure. The electric current from the battery 323 is stored and amplified by the boost converter 324. The boost converter 324 is a DC-DC switching regulator that steps battery voltage up (typically) from 3 volts to 5 volts which is (typically) the operating voltage of the microcontroller 35 and the motor driver 334. The motor driver 334 is typically a low current H-bridge that provides bipolar power to the motor 331 that ultimately turns the TAC knob 151 to adjust the temperature set point on the thermostat 14. The boost converter 324 also provides electrical power to the microcontroller 35 which is used to read data and other information incoming from the control unit radio 39 which receives command signals from the remote unit 40 and temperature differential signals from the on-demand sensor 123. The microcontroller 35 also generates commands to the motor 331 to ultimately move the TAC knob 151 which dictates the temperature set point on the thermostat 14. The control unit radio 39 communicates with the data processors inside the microcontroller 35 through the SPI Bus 352 which is a serial peripheral bus. The GPIO bus 351 is a general purpose input and output bus for the circuit board 353 (not shown) upon which the microcontroller 35 is mounted. The limit switch 36 is a single pole, double throw switch connected to the high side of the microcontroller's 35 power supply. Its physical movements provide information to the microcontroller 35 which interprets those movements to determine whether the control unit 30 is in a "cold" setting or a "hot" setting.

The on-demand sensor (switch) 123 is a thermocouple-based comparator circuit that is mounted non-intrusively on the cold water inlet pipe 12 of the water heater 10. The on-demand sensor 123 signals the control unit when there is movement of water in the cold water inlet pipe 12 on the water heater 10. This allows the control unit 30 to sense when a hot water tap at a fixture 25 (refer to FIG. 3A) has been turned on and send an activate signal to the heat source 16. The on-demand sensor (switch) 123 sends an electric signal to the on-demand switch jack 316 via the on-demand sensor signal wire 124. The signal goes through the GPIO bus 351 and into the microcontroller 35. The microcontroller 35 interprets this signal as a demand for hot water and sends an "activate" signal to the heat source 16 which in turn, increases the temperature on the water heater 10. This on-demand feature is a significant improvement over devices taught by the prior art in that it adds an important user-activated feature to the process of heating water in a commercial or residential hot water system. FIG. 4C is a circuit diagram of the control unit 30.

FIG. 4D is a schematic diagram of the remote command signal computer and control unit ("remote unit") 40 showing the major operational components of the remote unit 40. The battery 442 is the power source for the remote unit 40. The electric current from the battery 442 is stored and amplified by the boost converter 443. The boost converter 443 is a DC-DC switching regulator that steps battery voltage up from (typically) 3 volts to 5 volts which is the operating voltage of the microcontroller 45. The boost converter 443 provides electrical power to the microcontroller 45 which is used to process data coming from the keypad 42, the real-time clock 453, and the battery monitor circuit 444. It also sends display signals to the LCD screen 43 and command signals to the command signal transmitter ("radio") 46. The radio 46 communicates with the data processors inside the microcontroller 45 through the SPI Bus 452 which is a serial peripheral bus. The GPIO bus 451 is a general purpose input and output bus for the circuit board 455 (not shown) upon which the microcontroller 45 is mounted.

The microcontroller 45 is used to record and interpret user inputs and preferences. It also reads time information and uses it to commands to the control unit 30 via the remote unit's 40 radio 46. The radio 46 is used to send on or off bytes (command signals) to the control unit 30. The real-time clock 453 keeps track of time over long periods; it is used by the microcontroller 45 as a reference. The keypad 42 represents the user's input method. It allows the user to navigate menus to set the preferred on/off time schedule, to access the "vacation mode," to override schedules, and to set the time. The LCD screen 43 is the user's main feedback method. It displays relevant data when the remote unit 40 is being used to set preferences and it displays current time and the status of the water heater 10 when idle. FIG. 4E is a circuit diagram of the remote unit 40. FIG. 4F is a schematic diagram of the preferred embodiment showing the recirculation pump control jack 214, the recirculation pump control unit 21 and the recirculation pump 22. FIG. 4G shows a schematic diagram of the hardwired version of the preferred embodiment 30.

FIGS. 5A-17 show the structural elements of the present invention. Specifically, FIG. 5A is a bottom-up left-front perspective of the control unit 30. The control unit 30 is housed in the main case 31 which is a generally rectangular box-like container with an open semi-cylindrical portion extending outward from the upper right-hand corner. The main case 31 is typically made of plastic or sheet metal but numerous other compositions including, without limitation, rubber, composites, synthetic polymers, and the like. If made of plastic, the main case 31 is typically an injection-molded plastic case. It provides structure for the control unit 30 as well as housing for the major electrical and mechanical elements.

The main case face plate 312 is at the front of the control unit 30. It is removable thereby permitting the user to gain access to the battery tray 311 (refer to FIG. 5B) as well as components located on the inside of the main case 31. The main case pointer arrow 314 is an etched, engraved, or elevated arrow-shaped directional pointer that tells the user the position of the TAC Knob 151 (not seen in FIG. 5A). The main case pointer arrow 314 is aligned with the temperature set point alignment mark 154 so that when any of the markings on the TAC knob 151 are aligned with the main case pointer arrow 314, they would also be aligned with the temperature set point alignment mark 154.

Two square apertures are located on the main case bottom 318 and function to permit connections between the control unit 30 and other components. The relay output portal 216 (refer back to FIG. 3B) is closed on the simplest embodiment of the present invention. (On the preferred embodiment, it accepts a standard electrical plug and connects the control unit 30 to the recirculation pump 22 thereby providing electric power to the recirculation pump 22. This is discussed further in the description of the preferred embodiment below.) The on-demand switch jack 316 (refer back to FIG. 4B) accepts the electric wire 124 connecting the on-demand sensor (switch) 123 to the control unit 30. The control unit on-off switch 319 is also located on the main case bottom 318. This on-off switch 319 permits the user to activate or deactivate the control unit 30 as desired and may be configured as a toggle switch, a button switch, or the like. Several mounting holes 317 are present which permit fixably mounting the control unit 30 onto the water heater 10 if desired. Finally, several screw holes 317S located along the corners of the main case 31 provide countersunk apertures permitting the sides of the main case 31 to be fixably attached to one another.

FIG. 5A also shows several components located inside the main case 31 but are visible through the opening in the main case face plate 312. These components, which are described in more detail below, include the main gear 341, the beak 349, and the high stop 348.

FIG. 5B is an exploded view of the control unit 30 showing the components of the control unit 30 and how they are related to the TAC unit 15. Looking at the left side of FIG. 5B, the temperature adjustment control ("TAC") 15 is fixably mounted (refer to FIGS. 1 & 2) on the water heater 10 (not shown in FIG. 5B). Typically, the TAC knob 151 fits snugly over the temperature set point control shaft ("heater control shaft") 153 which is connected to a movable temperature set point control 152 located inside the TAC unit 15. The temperature set point control 152 sends an electric signal to the thermostat 14 to change the temperature set point inside the water heater 10. The TAC knob 151 has markings which indicate the temperature set point options available to the user. These markings typically correspond to separate thermostat 14 settings to determine the temperature inside the water heater 10 and will typically include temperature set points for hot, very hot, and extremely hot water; there is usually a "vacation" setting that keeps the water at a warm to lukewarm temperature and a "pilot light" setting where the pilot light remains on but there is no heating taking place at all. In an electric water heater 10, the pilot light setting would correspond to no current entering the heating elements 161. In this typical configuration, the "extremely hot water" setting represents a high point on the temperature range controlled by the thermostat 14 while the "pilot light" setting represents a low point on the temperature range controlled by the thermostat 14. To change the temperature set point inside the water heater 10, the user would twist the TAC knob 151 left or right to align the markings on the TAC knob 151 with the temperature set point alignment mark 154 on the TAC unit 15. Accordingly, if the user wanted extremely hot water in the water heater 10, he/she would turn the TAC knob 151 to the left until the "extremely hot water" marking on the knob 151 was aligned with the temperature set point alignment mark 154. If the user wanted to conserve energy while on vacation, he/she would turn the TAC knob 151 to the right until the "vacation" marking on the knob 151 was aligned with the temperature set point alignment mark 154.

With the control unit 30 installed, the TAC knob 151 fits snugly over the beak 349 which passes through the high stop 348 to be fixably attached to the main gear 341. The main gear 341 is fixably attached to the temperature set point control 152 so that any movement of the main gear 341 will bring about a corresponding movement of the temperature set point control 152. With this configuration, the user can still manually change the temperature set point with the control unit 30 installed.

FIG. 5B shows that the main case 31 would be fixably mounted onto the TAC unit 15 using screws or rivets passing through the mounting holes 317 and terminating in the TAC unit 15. A battery tray 311 is seen on the right hand side of the main case 31. The battery 323 (not shown) would fit snugly inside the battery tray 311 and the battery tray face plate 313, which is flush with the main case face plate 312, would keep the battery 323 clean and dry. FIG. 5B shows several other components located inside of the main case 31: the pinion 347 is movably connected to the motor control unit 33 which turns the pinion 347 which subsequently turns the main gear 341. The main gear 341 meshes with the pinion 347 and connects to the heater control shaft 153 by means of a mating spline 342 (not shown) thereby allowing the motor 331 to turn the heater control shaft 153 which, in turn, changes the heat setting on the water heater 10.

The motor control unit 33 houses the motor 331, the gear box 332, and the output gear 333 (none are shown in FIG. 5B). The motor 331 drives the output gear 333 which, in turn, drives the pinion 347. The limit switch 36 is connected to the high side of the battery 323 and is triggered by a high stop 348 and a low stop pin 346 (refer to FIG. 6) signaling the microcontroller 35 that the main gear 341 has reached the high (temperature) or low (temperature) points respectively. The main case pointer arrow 314 gives a visual clue as to the temperature setting inside the water heater 10.

FIG. 6A is a front elevation view of the control unit 30 showing the main case 31, the main case face plate 312, the battery tray face plate 313, two mounting holes 317, and several screw holes 317S. FIG. 6 also shows some operational components of the control unit 30. The main gear 341 and connects to the heater control shaft 153 (not shown) allowing the motor 331 (not shown) to turn the shaft 153 which is fixably connected to the temperature set point control 152. This turning motion allows the control unit 30 to change the desired temperature setting in the water heater 10. The beak 349 is typically an injection-molded shaft section with a "head" similar to the head on the heater control shaft 153 thereby allowing the beak 349 to be fitted to the heater control shaft 153. The beak 349 holds the TAC knob 151 and preloads the high stop 348 thereby keeping the high stop 348 from rotating when it hits the limit switch 36. The high stop 348 is typically an injection-molded ring with a boss and a handle to allow the user to set the "hot" end of the heater control shaft's 153 range of motion. The high stop 348 has a protrusion to trip the limit switch 36 when the main gear 341 gets to the high (temperature) position. The high stop 348 also has a small protrusion extending beyond the main case face plate 312 to allow the user to manually rotate the temperature set point control 152 to the desired position. The low stop pin 346 signals the limit switch 36 that the main gear 341 has reached the low (temperature) position.

FIG. 6B is a cutaway front elevation view of the control 30 unit showing several components found inside the main case 31. The motor 331 turns the pinion 347 (not seen because it is hidden by the motor control unit 33) which, in turn, meshes with the main gear 341. The batteries 323 are housed in the battery tray 311 and are electrically connected to the motor control unit 331 and the limit switch 36. FIG. 6B also shows the spatial relationships between the two stops (the high stop 348 and the low stop pin 346) and the limit switch 36. FIG. 6B also shows the spatial relationship between the beak 349 and the limit switch 36. Finally, FIG. 6B shows the motor control unit 33 and the limit switch 36 connected to the circuit board 325.

FIG. 7 is rear elevation view of the control unit 30 showing the reverse side of the main gear mating spline 342 which connects the main gear 341 (not shown) to the heater control shaft 153 (refer to FIG. 5B). This view is looking into the opening in the main case 31 that would surround the TAC unit 15 when the control unit 30 is mounted on a water heater 10. FIG. 7 also shows the reverse side of the pinion 347. As with the main case face plate 312, the main case bottom 318 contains mounting holes 317 and screw holes 317S.

FIG. 8 is a left-side elevation view of the control unit 30 and FIG. 9 is a right-side elevation view of the control unit 30. FIGS. 8 and 9 both show the main case pointer arrow 314, the high stop 348, and the beak 349 protruding from the main case 31. When the control unit is installed on a water heater 10, the TAC knob 151 would cover the beak 349. Finally, these FIGS. 8 and 9 also show the control unit on-off switch 319, which, as its name implies, turns the control unit 30 on or off.

FIG. 10 is a bottom-up plan view of the control unit 30 and FIG. 11 is a top-down plan view of the control unit 30. FIG. 10 shows a cavity on the bottom of the main case 31 which would fit over the top of the TAC unit 15. The main gear mating spline 342 would be fixably attached to the temperature set point control shaft 153 so that any movement of the main gear 341 would be directly transferred to the temperature set point control shaft 153 so as to change the temperature set point in the thermostat 14. FIG. 11 shows, on the bottom of the main case 31, the control unit on-off switch 319, the recirculation pump jack 315 (which is closed in the simplest embodiment), and the on-demand switch jack 316. FIG. 10 and FIG. 11 both show the main case pointer arrow 314, the high stop 348, and the beak 349 protruding outside of the main case 31.

FIG. 12 is a top-down right-front perspective view of the (portable) remote command unit 40. Similar to the control unit 30, the remote unit 40 has a remote case 41 that houses the remote unit's 40 electronics and user interface elements. It is typically an injection molded rectangular plastic case with cutouts for an LCD screen 43, a keypad 42, and a power switch 415. The remote unit 40 has a fixed remote case face plate 412 with the above-mentioned cutouts and a fixed back plate 413 (not shown on FIG. 12). The backside of the remote unit 40 also has a removable battery tray back plate 414 that provides access to the battery tray 411 (not shown on FIG. 12).

FIG. 13A is a front elevation view of the (portable) remote command unit 40 and FIG. 13B is a cutaway front elevation view of the (portable) remote command unit 40. FIG. 13A shows the remote case 41 and the remote case face plate 412 in a finished state having the LCD screen 43 and the keypad 42 ready for use by the user. The keypad 42 is a matrix output "chiclet" keypad having six keys identified with symbols: the "up key" 421 has an arrow pointing upward; the "down key" 422 has an arrow pointing downward; the "next screen" key 423 has an arrow pointing sideways; the "enter" key 424 has the word "TAB" on its face; the "override—hot" key 425 has the letters "O-R" on its face and is located in the top row of the keypad 42; and the "override—cold" key 426 has the letters "O-R" on its face and is located in the bottom row of the keypad 42. The other "command" feature shown in FIG. 13A is the on-off switch 415. While the present invention has six functional keys in the keypad 42 the number may increase to accommodate additional commands and preferences.

As mentioned above, FIG. 13B is a cutaway front elevation view of the (portable) remote command unit 40 showing some of the internal components inside the remote case 41. The microcontroller 45 is embedded in the circuit board 455 depicted in FIG. 13B and is used to record and interpret the user's inputs and preferences. The microcontroller 45 also reads time information and uses this to send commands to the control unit 30 by radio 46 (not shown). The batteries 442 are housed in a battery tray 411 under the keypad 42. the on-off switch 415 has wires 415W connecting the switch 415 to the batteries 442 and the circuit board 455 and the microcontroller 25.

FIG. 14A is a rear elevation view of the (portable) remote command unit 40 showing the remote case 41, the remote case back plate 413, and the removable remote case battery tray back plate 414 which can be removed by the user to access the battery tray 411 holding the batteries 442. FIG. 14B is a cutaway rear elevation view of the (portable) remote command unit 40 showing the circuit board 445 housing the microcontroller 45, the command signal radio transmitter 46, the battery tray 411, the LCD screen 43, and the wires 415W connecting the on-off switch 415 to the batteries 442 and the circuit board 445.

FIG. 15 is a top-down plan view of the (portable) remote command unit 40 and FIG. 16 is a bottom-up plan view of the (portable) remote unit 40. FIG. 17 is a right-side elevation view of the (portable) remote command unit 40 and FIG. 18 is a left-side elevation view of the (portable) remote command unit 40. FIGS. 15-18 all show the remote case 41 and the keypad 42. FIGS. 15, 17, and all 18 show the remote unit on-off switch 415.

Description of the Preferred Embodiment

The preferred embodiment of the present invention contemplates using the control unit 30 to control the operation of the recirculation system 20 as well as the operation of the water heater 10. Referring to FIGS. 3A and 3B, a typical commercial or residential recirculation system 20 typically consists of an electrically powered recirculation pump 22 connected to a hot-water recirculation line 23 that runs in a loop from the recirculation pump 22 to the water heater 10, through the recirculation lines 23 running throughout the residential or commercial structure, into hot water supply pipes 24 serving various fixtures 25 throughout the commercial or residential structure, and then back to the recirculation pump 22. The recirculation pump 22 is typically activated manually by an electric power switch starter 221 or automatically by a recirc pump thermostatic starter 222 (not shown), a recirc pump timer starter 223 (not shown), or a recirc pump motion sensor starter 224 (not shown). The recirculation pump 22 removes cooler water standing in the supply pipes 24 and the recirculation line 23 and sends it back into the tank 11 for reheating and redistribution. Accordingly, there is a continuous supply of freshly reheated water in the vicinity of any fixture 25 thereby reducing the amount of water wasted while, waiting for hot water to emerge from the fixture 24 once it is turned on.

As seen in FIGS. 3B and 4F, the present invention contains a recirc system control unit 21 that receives a remote signal to activate or deactivate the recirculation pump 22. The signal going to the recirc system control unit 21 allows the user to activate the electric power starter switch 221 and bypass the other starter devices 222, 223, 224 without having to be physically next to the recirculation pump 22. The recirc system control unit 21 typically draws its power from a main power source 211 such as a standard household electrical outlet providing 110 volt 60 cycle power. While other types of electrical power are contemplated for alternate utility systems, 110V-60 cycle is the most common.

The recirc system control unit 21 has an internal power supply 212 such as a battery or a solar power cell that, in response to the remote activation or deactivation command, sends a signal to the recirculation pump control jack 214 and through the relay control line 215 that closes or opens the relay 213 thereby permitting or not permitting electric power to pass through the relay 213 and the relay output portal 216 to power the recirculation pump 22.

Accordingly, the recirc system control unit 21, in response to a command signal from the control unit 30, takes electric current from the main power source 211, feeds the electric current into a (now closed) relay 213 that sends it to an output portal 216 and into the electric power starter switch 221 which starts or stops the recirculation pump 22. This remote signal commands the internal power supply 212 to generate an internal command signal to the relay 213 to open or close thereby starting or stopping the flow of electric current from the power supply 211 through the relay output portal 216 and into the recirculation pump 22.

FIG. 3B also shows a connection between the main power source 211 and the internal power supply 212. This connection provides a conduit whereby the main power source 211 can recharge the internal power supply 212 or keep it charged and ready to send an "open relay" or "close relay" command to the relay 213 via recirculation pump control jack 214.

An electric power starter switch 221 is typically located inside the recirculation pump 22. The switch starter 221 can be manually controlled by simply pressing an "on" or "off" button on the outside of the pump 22. When it is in the "on" position, the electric power switch starter 221 closes the electric circuit between the relay output portal 216 and the recirculation pump 22 thereby causing the recirculation pump motor 225 to begin moving water through the recirculation system 20.

The electric switch starter 221 can also be activated or deactivated remotely. A remote signal receiver 217 located in the recirc system control unit 21 receives an activation or deactivation signal from a remote source (which is typically the control unit 30). The remote signal receiver 217 passes the command signal to the internal power supply 212, through the recirculation pump control jack 214 and the relay control line 215. A remote activation signal closes the relay 213 thereby completing the electric circuit between the main power source 211 and the recirculation pump 22 thereby causing the recirculation pump motor 225 to begin moving water through the recirculation system 20. Conversely, a remote deactivation signal opens the relay 213 thereby opening or breaking the electric circuit between the main power source 211 and the recirculation pump 22 which causes the recirculation pump motor 225 to stop moving water through the recirculation system 20.

Some recirculation pump motors 225 can also be started by a recirc pump thermostatic starter 222 which senses a prescribed temperature drop in the water in the supply pipes 24 and subsequently starts the recirculation pump motor 225 to begin moving water through the recirculation system 20. The recirculation pump motor 225 can also be started by a recirc pump timer-starter 223 which, at predetermined intervals or predetermined times, starts the recirculation pump motor 225 to begin moving water through the recirculation system 20. The recirculation pump motor 225 can also be started by a motion sensor starter 224 which starts the recirc pump motor 225 in response to a detected movement of water in the supply pipes 24. The command signal coming from the remote signal receiver 217 and opening or closing the relay 213 will bypass these other starters 222, 223, 224. The operation of the recirc system control unit 21 ensures that the recirculation pump 22 is moving water through the recirculation system 20 any time that the water heater 10 is heating.

FIG. 4F is a schematic diagram of the control unit 30 and shows its major operational components. The battery 323 is the power source for the control unit 30 and (as seen in FIG. 3B) the internal power supply 212 for the recirc system control unit 21. FIG. 4F is essentially the same as FIG. 4B except that FIG. 4F shows the addition of components related to the controls unit's 30 interface with the recirculation system 20. Accordingly, FIG. 4F also shows the recirculation pump control jack 214, the recirc system control unit 21, and the recirculation pump 22 itself.

The control unit 30 would typically receive a signal from the on-demand sensor 123 whenever the user turns on a hot water fixture 25. As discussed in the description of the simplest embodiment above, the GPIO bus 351 feeds this signal into the microcontroller 35 which interprets the signal as a demand for hot water and transmits an activate command to the heat source 16. In this preferred embodiment, the microcontroller also sends a parallel signal to the recirculation pump control jack 214 (refer back to FIG. 3B). The activation command closes the relay 213 which allows electric current to flow from the main power source 211 to the recirc system control unit 21 and ultimately to the recirculation pump 22. (FIG. 5A) The relay output portal 216 (refer back to FIG. 3B) accepts a standard electrical plug and connects the control unit 30 to the recirculation pump 22 thereby providing electric power to the recirculation pump 22. Accordingly, in the preferred embodiment, any time the control unit 30 sends an activate signal to the electric heating elements 161 or the fuel burner jet 162, it also activates the recirculation pump 22. This feature, parallel heating and recirculation of water, is another improvement over the prior art which typically treats heating and recirculation as independent and non-connected functions.

Description of Alternative Embodiments of the Invention

An alternative embodiment of the present invention contemplates an additional remote command signal computer and control unit that is hardwired to the control unit 30, the on-demand sensor 123, and the recirc system control unit 21. This command signal computer/control station ("CCS") 50 would have most of the elements found in the remote unit 40 but would depend upon an electrical connection between the CCS 50 and the control unit 30. This CCS 50 would be compatible with the simplest embodiment of the present invention as well as the preferred embodiment. Accordingly, the components of a CCS 50 would also be housed in a case 51 with a keypad 511 and a LCD screen 512. Inside, the CCS would also have a microcontroller 52 with a GPIO bus 521 and a SPI bus 522 performing the same functions as those located in the remote unit 40. The CCS 50 would have a power source 53 other than an internal battery. For example, the CCS 50 could be powered by electricity coming from an external source such as a common household outlet. Another option is solar power. In addition to the microcontroller 52, the CCS 50 would also have a real-time clock 54 that would also keep track of time over long periods and serve as a reference for the microcontroller 52. Because the CCS 50 depends upon electrical connections to the control unit 30, a command signal transmission line 55 would be a necessary part of this alternative embodiment. This line 55 would go from an output portal 56 to the control unit 30. Any command signal from the CCS 50 would be transmitted electrically from the CCS 50 to the control unit 30 and directly to the GPIO bus 351 and into the microprocessor 35 which would read that signal the same way it reads a radio signal from the wireless remote unit 40.

This configuration would also work with inputs to the control unit 30 from a CCS 50 embodied as a personal computer, laptop computer, and the like. In this case, the connection between the CCS 501 and the control unit 30 would entail the use of computer-specific connections such as USB cables, DIN cables, SATA cables, Ethernet cables, and the like. The command signal would be generated at the CCS 501 (computer), transmitted to the control unit 30 over computer-specific connections, and directly to the GPIO bus 351 and into the microprocessor 35 which would read that signal the same way it reads a radio signal from the wireless remote unit 40.

Another embodiment of the present invention contemplates the use of a mobile communication device such as a cell phone as wireless remote unit 40. The control unit 30 would require a receiver 391 such as a key fob that is compatible with the user's personal communication device 401. The user would send a command signal from the device 401 to the receiver 391 and directly to the GPIO bus 351 and into the microprocessor 35 which would read that signal the same way it reads a radio signal from the wireless remote unit 40.

Another embodiment of the invention contemplates the use of a tray or drip pan 17 under the water heater 10. This tray or drip pan 17 would be configured with wire sensors 171 electrically connected to the control unit 30 by drip pan signal transmission lines 172. Upon coming into contact with water such as that coming from a leaking fixture in the water heater 10, the wire sensors 171 would experience a short circuit and send a signal to the microprocessor 35 in the control unit 30 alerting it to the fact that the water heater 10 is experiencing a leak of some sort. This information would also be relayed to the microprocessor 45 in the remote unit 40 where it would be available to the user who could take some remedial action. The use of the drip pan 17 is contemplated for embodiments using the remote unit 40 as well as embodiments using both the remote unit 40 and the CCS 50. It is also contemplated for the simplest embodiment and the preferred embodiment. This embodiment would also function effectively without the tray or drip pan 17 in which case the wire sensors 171 would come into contact with water on the surface upon which the water heater is mounted (pavement, flooring, etc.).

Another embodiment of the invention contemplates the use of a remote recording device 47 (for the remote unit 40) and or a CCS recording device 57 (for the CCS 50). The recording device 47, 57 would be located inside the case 41, 51 and would digitally record all commands sent to the control unit 30.

In another embodiment of the present invention, the on-demand sensor 123 would also be configured to detect near-freezing water temperature in the cold water conduit 12 and transmit a signal to the control unit 30 which would process that signal as a freeze warning and send a signal to the heat source 16 to heat the water in the water heater. The control unit would also send a simultaneous signal to the circ system control unit 21 to activate the circulation pump 22 thereby preventing the water lines from freezing and bursting.

Operation of the Preferred Embodiment

As described in the forgoing sections, the preferred embodiment of the present invention is comprised of four separate devices which interface with each other: the control unit 30, the remote unit 40, the recirculation system control unit 21, and the on-demand sensor 123. The remote unit 40 allows the user to manually input on and off times for the control unit 30 as well as manually activate the control unit 30. The interface or communication between the remote unit 40 and the control unit is via a radio transmitter 46 embedded in the remote unit 40 and a receiver 39 in the circuit board 325 of the control unit 30. The radio transmission is a one-way transmission and is limited to an "on" or an "off" command.

The control unit has two jacks, the recirculation pump jack 315 and the on-demand switch jack 316, which are used to connect the control unit 30 to the recirculation pump control unit 21 and the on-demand sensor 123. As mentioned previously, in the simplest embodiment, the recirculation pump jack 315 is closed (not operational). The purpose of the recirculation pump control unit 21 is twofold: it provides a low voltage DC power supply 212 for the control unit 30 allowing it to run without drawing down the batteries 323. The recirculation pump control unit 21 also contains a relay 213 that the control unit 30 can turn on or off so that the recirculation pump 22 will only be "on" when the control unit is "on." The recirc system control unit 21 typically draws its power from a main power source 211 such as a standard household electrical outlet providing 110 volt 60 cycle power. While other types of electrical power are contemplated for alternate utility systems, 110V-60 cycle is the most common.

The recirc system control unit 21 has an internal power supply 212 such as a battery or a solar power cell that, in response to the remote activation or deactivation command, sends a signal to the recirculation pump control jack 214 and through the relay control line 214 that closes or opens the relay 213 thereby permitting or not permitting electric power to pass through the relay 213 and the relay output portal 216 to power the recirculation pump 22.

Accordingly, the recirc system control unit 21, in response to a remotely generated command signal, takes electric current from the main power source 211, feeds the electric current into a relay 213 that sends it to an output portal 216 and into the electric power starter switch 221 which starts or stops the recirculation pump 22. This remote signal commands the internal power supply 212 to generate an internal command signal to the relay 213 to open or close thereby starting or stopping the flow of electric current from the power supply 211 through the relay output portal 216 and into the recirculation pump 22.

The on-demand sensor 123 is a thermal sensor/switch that is attached to the cold water inflow line 12 of the water heater 10. When a hot water fixture 25 is opened, the cold water inflow line 12 begins drawing cold water into the tank 11, which cools the on-demand sensor 123 until it triggers and sends a signal through the on-demand signal wire 124 to the microcontroller 35 on the control unit 30. The microcontroller 35 reads this signal and activates ("turns on") the control unit 30. The activation signal goes from the remote signal receiver (radio receiver) 217, through the recirculation pump control jack 214 and the relay control line 215 to close the relay 213 thereby allowing power from the main power source 211 to flow through the recirculation pump control unit 21, through the relay output portal 216 and to the electric power switch starter 221 thereby activating the recirculation pump 22. This feature allows the present invention to provide hot water on user demand.

The control unit 30 is typically an injection-molded plastic case 31 that holds the motor control unit 33 containing the motor 331 and motor driver 334. The main case 31 also houses the drive unit 34 which consists of the main gear 341 and the pinion 347. The motor driver 334 provides bipolar power to the motor 331 which turns the pinion 347 which meshes with the main gear 341 to move the temperature set point control shaft 153 on the water heater 10 gas valve. The control unit also houses the high stop 348 and the limit switch 36 which provide position feedback to the microcontroller 35 and the circuit board 325.

To install the control unit 30 (backward compatible embodiment as opposed to factory installed embodiment) the user would remove two of the four faceplate screws found on the water heater 10 gas valve and temperature set point control 152. The user would also remove the TAC knob 151 thereby exposing the temperature set point control shaft 153. The user would then place the control unit 30 on the face of the water heater gas valve and temperature set point control 152 so that the main gear mating spline 342 mates (aligns) with the temperature set point control shaft 153. Two long screws would be put through the mounting holes 317 and threaded into the holes in the water heater 10 gas valve and temperature set point control 152. If the screws are not available, the control unit can be attached to the water heater 10 gas valve and temperature set point control 152 by external means such as clamps, bindings, and the like. In either case, once the control unit has been mounted on to the water heater 10 gas valve and temperature set point control 152, any rotation of the main gear 341 will correlate to a 1:1 rotation of the temperature set point control shaft 153.

The user would then place the TAC knob 151 over the beak 349. This permits the user to see the actual setting of the heater gas valve by looking at the location of the TAC knob 151 with respect to the main case pointer arrow 314 which, as mentioned previously, is situated directly above the temperature set point alignment mark 154.

The limit switch 36 is connected to the high side of the battery 323 and is triggered by a high stop 348 and a low stop pin 346 (refer to FIG. 6) signaling the microcontroller 35 that the main gear 341 has reached the high (temperature) or low (temperature) points respectively. The high stop 348 is typically an injection-molded ring with a boss and a handle to allow the user to set the "hot" end of the heater control shaft's 153 range of motion. The high stop 348 has a protrusion to trip the limit switch 36 when the main gear 341 gets to the high (temperature) position. The high stop 348 also has a small protrusion extending beyond the main case face plate 312 to allow the user to manually rotate the temperature set point control 152 to the desired position. The low stop pin 346 signals the limit switch 36 that the main gear 341 has reached the low (temperature) position.

The foregoing describes the two "stops" associated with the control unit 30: the "lower stop" which corresponds to the "pilot light" setting on the water heater 10 and the "upper stop" which is user-adjusted. The lower stop setting is built into the main gear 341 as a small protuberance which contacts the limit switch 36 when the main gear 341 rotates to the "pilot light" position. This pushes the limit switch 36 into the "low" position thereby signaling the microcontroller 35 to turn off the motor 331 and the recirculation pump 22 and record the control unit in the "off" position.

The high stop 348 is a separate, cast or injection-molded piece that is free to rotate about the axis of the main gear 341; however, it is pushed against the main gear face 345 by a small amount of preload on the beak 349 which sandwiches the high stop 348 against the main gear 341. This allows a user to move the position of the high stop 348 by firmly gripping the TAC knob 151 (which has been mounted upon the beak 349) and twisting the high stop 348 to the desired position (indicated by the high stop's 348 position with respect to the TAC knob 151). The friction between the two prevents the high stop 348 from rotating when it presses against the limit switch 36.

The primary purpose of the remote unite 40 is to act as an interface with the control unit 30. The keypad 42 and the LCD screen 43 allow the user to enter daily operational cycles which are daily on/off times for their water heater 10. Further, the user can use the remote unit 40 to manually turn the water heater 10 on or off by using the "override" buttons 425, 426. The remote unit 40 can also store a "vacation mode" of operation which is a user-defined set of time and dates during which the water heater 10 will remain off. The user uses the keypad 42 and the LCD screen 43 to accomplish these tasks.

The keypad 42 and LCD screen 43 are attached to the inner portion of the remote case 41 via screws. The microcontroller 45, command signal transmitter (radio) 46, boost converter 443, battery leads 415W, and other miscellaneous components (GPIO bus 451 and SPI bus 452) are all integrated into a printed circuit board 455. The circuit board 455 receives power from a power source 44 which is typically a battery 442. The circuit board 455 is conditioned to be used by the microcontroller 45, the LCD screen 43, the real time clock 453, and the command signal transmitter (radio) 46. The keypad 42 has six input keys which the user can use to navigate through menus and options presented by the microcontroller 45 and displayed on the LCD screen 43.

The next screen key 423 changes the menu screen displayed on the LCD screen 43 from one menu to another. Accordingly, the user can change the display on the LCD screen 43 from the clock screen display, to the timer set screen display, to the vacation mode screen display, and so on. While these three displays are the most common, other more detailed or function specific displays can be incorporated into the list of available displays.

The "enter" key 424 ("TAB" displayed on its face) changes the field to be modified. For example, in the clock set screen display, depressing this key 424 would move the cursor seen on the LCD screen 43 to the AM/PM selection and back. The up key 421 increases the value of the selected field while the down key 422 decreases the value of the selected field. The override hot key 425 sends a "go to the hot setting" signal to the control unit 30. The override cold key 426 sends a "go to the cold setting" signal to the control unit 30. In conjunction with the modification keys 421-426, the user can change the clock settings (current time, day, date) as well as the cycle settings and the vacation mode settings. A cycle is a paired set of on and off times for a given weekday. The remote unit 40 can store two cycles per weekday, giving the user two possible on times and two possible off times per day of the week.

The LCD screen 43 is typically a four line, 16 characters per line LCD. It displays the current time and status of the control unit 30 as well as any error messages (such as a low-battery power warning). When the user is entering information and preferences, the LCD screen 43 displays a menu screen and cursor. The user's selection is entered whenever a key is pressed and that selection updates the selections stored by the microprocessor 45. In the event that no selections are entered, the display on the LCD screen returns to the default display: time/status of the control unit 30.

The remote unit 40 handles all timing and information storage duties and uses an embedded radio transmitter 46 to send single byte "on" or "off" messages to the control unit 30. The remote unit 40 records user-entered on/off times thereby allowing the user to choose two "on" and two "off" tomes per day of the week as well as an automatic "vacation mode." The microcontroller 45 stores the on/off times and uses them to automatically turn the water heater 10 on or off. The microcontroller 45 takes the time inputs selected by the user and compares these inputs to timing information taken from the real time clock 453. When there is a "match," (i.e., it is time to turn the water heater 10 on or off, the microcontroller 45 activates the radio transmitter 46 and sends the appropriate command signal to the control unit 30. Further, the remote unit 40 can be used to manually control the state of the control unit 40.

In summary, the operation of the present invention has an automatic phase and a manually generated "override" phase. In the automatic phase, the on-demand sensor 123 senses a temperature differential in the inlet conduit 12 and generates a signal to the control unit 30 which processes that signal and generates an activation command to the heat source 16 and, in systems having a recirculation system 20, the recirc system control unit 21. The user can also send the activation command manually through a remote unit 40 or a CCS 50 pressing the override hot key 425 to activate or the override cold key 426 to deactivate. The user could also use the keypad 42, 511 to input predetermined activate and deactivate dates and times into the control unit 30. The microprocessor 35 in the control unit 30 stores these inputs and automatically activates and deactivates the heat source 16 and, as appropriate, the recirculation pump 22 pursuant to those inputs.

To input these preferences, the user simply accesses the keypad 42, 511 and types or punches in the desired settings and start/stop dates and times for the temperature adjustment control unit 15 and the recirculation system 20. The new settings are transmitted wirelessly or through the command signal transmission lines 55 to the control unit 30.

On a fuel-fired water heater 10, the command signal to change the setting of the temperature adjustment control unit 15 will activate the motor 331 and turn the main gear 341 which is attached to the heater control shaft 153 which is attached to the temperature set point control 152. The main gear 341 is also attached to the TAC knob 151 which causes the TAC knob 151 to turn to the right showing an increase the temperature setting or to the left to show a decrease in the temperature setting. Since the main case pointer arrow 314 is aligned directly over the temperature set point alignment mark 154, the user will be able to read the temperature readings on the face of the TAC knob 151 to determine the temperature set point in the water heater 10. On an electric water heater 10, the command signal to change the setting of the temperature adjustment control unit 15 will activate will change the resistance setting(s) on the heating elements 161 causing them to heat the water to a higher or lower temperature as desired. TAC knob cover 151 fits snugly over the TAC knob 151, the TAC knob will turn with the control knob cover 43 and thereby physically change the thermostat 14 set temperature. This command signal can be automatically generated upon a signal from the on-demand sensor 123 to the control unit, manually generated by using one of the override keys 425, 426 on the keypad 42 to send a command signal to the control unit, automatically generated from the control unit 30 based upon user-generated inputs to the control unit 30 from the remote unit 40, 50, or physically generated by simply twisting the TAC knob 151 to the desired setting.

The user remotely transmits activate and deactivate command signals to the control unit 30 by entering start/stop/date/time preferences into the keypad 42, 511 which transmits those preferences either by radio 39 or land line 55; at the selected time(s), the control unit 30 transmits a signal to the electric power switch starter 211 to activate/deactivate the recirculation pump 21 and simultaneously transmits a command signal to the heat source to commence/cease heating the water in the water heater 10.

Thus, the remote unit 40 and the CCS 50 also permit the user to input a significant number of time commands to the control unit 30. Unlike the devices disclosed by the prior art, the present invention is not limited to one or just a few inputs as to water heater 10 start/stop times, recirculation pump 21 start/stop times, and changes in set temperature. The control unit 30 can be programmed to send a multitude of signals to the recirculation system 20, and the hot water heating system so that the user can accommodate vacations, periods with multiple guests visiting followed by periods of vacancy, and the like.

What is claimed is:

1. A backward compatible, programmable, and on-demand hot water heater control unit comprising:
  a. a hot water heater temperature control unit ("control unit"), said control unit having:
    (1) a generally rectangular box-shaped case that houses said control unit's major electrical and mechanical components, said case having a removable faceplate and a semi-cylindrical protrusion extending outward from its upper right-hand corner, said protrusion truncated on its back-side so as to fit securely over a temperature adjustment and control unit ("TAC unit") found on a standard, commercially available hot water heater, said TAC unit having had its knob removed from its temperature set point control shaft ("heater control shaft"),
    (2) a battery power source, accessible through said removable faceplate and providing power to said control unit's electrical and mechanical components, said battery connected to a boost converter that steps up said battery's voltage to an operating voltage compatible with said control unit's electrical components,
    (3) a battery-powered radio receiver,
    (4) a microcontroller imbedded in a circuit board that reads, processes, and records data coming from said radio receiver or an on-demand sensor and then electrically sends activation or deactivation signals to said hot water heater's fuel source, said microcontroller receiving input signals from said radio receiver through a serial peripheral ("SPI") bus and receiving signals from said on-demand sensor and sending command signals through a general purpose input-output ("GPIO") bus,
    (5) a motor with an output gear,
    (6) a motor driver that provides bipolar power to said motor,
    (7) a main gear that meshes with said output gear, said main gear having a mating spline that connects said main gear to said heater control shaft, thereby allowing said motor to turn said heater control shaft, said main gear also having a built-in low stop,
    (8) a ring-shaped high stop with a boss and a handle, said high stop having a protrusion to trip a limit switch when said main gear reaches said heater control shaft's highest temperature setting and said handle protruding beyond said faceplate to allow a user to manually rotate said high stop to manually set said heater control shaft's highest temperature setting,
    (9) a single pole, double-throw limit switch having a common pole connected to said power source's high side, said limit switch having each throw connected to a different input pin, said input pins being pulled in opposite directions as said main gear moves thereby inputting information to said microcontroller as to whether said heater control shaft is at its highest temperature setting having reached said high stop or its lowest temperature setting having reached said low stop,
    (10) a beak firmly attached to said main gear and said heater control shaft and having a head similar in shape to that of said heater control shaft thereby allowing said beak to fit snugly into said knob which a user could use to manually enter temperature set point on said water heater,
  b. a remote command signal computer and control unit ("remote unit") said remote unit having:
    (1) a rectangular box-shaped case with a removable Backplate, said case housing said remote unit's electronic components,
    (2) a battery power source, accessible through said removable backplate and providing power to said remote unit's electrical components, said battery connected to a boost converter that steps up said battery's voltage to an operating voltage compatible with said remote unit's electrical components,
    (3) a microcontroller embedded in a circuit board that reads and records user inputs, compares said inputs against a real-time clock input, and sends activation and deactivation commands to said control unit, (4) a radio that transmits commands from said remote unit to said control unit, (5) a real-time clock that keeps time over long periods and provides said microcontroller with a time reference for sending activation and deactivation commands, (6) a key pad that allows a user to navigate several menus displayed by said microcontroller on a LCD screen and input preferred on/off time schedules for activating or deactivating said water heaters, access a vacation mode setting, override an already-entered schedule, or set correct time, (7) a LCD screen that displays relevant data when said remote unit is being used to input preferred on/off time schedules for activating or deactivating said water heaters, access a vacation mode setting, override an already-entered schedule, or set correct time, said LCD screen also displaying current time and water heater state when not being used for inputting new preferences, and c. a thermal sensor positioned on a cold water inlet conduit on a standard residential hot water heater, said thermal sensor capable of detecting a decrease in water temperature in said cold water inlet conduit and transmitting an electrical signal to said microprocessor which interprets said signal as a demand for hot water in said water heater and subsequently sending an activate command to said hot water heater.

2. The backward compatible, programmable, and on-demand hot water heater control unit in claim 1 further comprising an electric-powered recirculation system control unit ("RSC unit") with a backup battery-powered internal power supply charged by said RSC unit's electric power source, said RSC unit electrically connected to said control unit and a recirculation pump in such manner that an activation/deactivation signal from said microcontroller to said water heater will also generate a simultaneous signal to close/open a relay inside said RSC unit so that electricity from said RSC unit's electric power source flows/ceases to flow directly through an outlet portal to said recirculation pump thereby activating/deactivating an electric power switch starter that starts/stops said recirculation pump, said recirculation pump connected to a commercial or residential water recirculation system.

3. The backward compatible, programmable, and on-demand hot water heater control unit in claim 2 further comprising a remote, electric-powered hardwired command signal control station ("CCS"), said CCS being identical in its electrical components to said remote unit except that said radio in said remote unit has been replaced with a command signal hardwire transmission line ("CCS line"), said CCS line connected to said control unit so that any command signal generated by said CCS's microcontroller would be transmitted to said control unit's microcontroller through said CCS line.

4. The backward compatible, programmable, and on-demand hot water heater control unit in claim 1 further comprising a remote, electric-powered hardwired command signal control station ("CCS"), said CCS being identical in its electrical components to said remote unit except that said radio in said remote unit has been replaced with a command signal hardwire transmission line ("CCS line"), said CCS line connected to said control unit so that any command signal generated by said CCS's microcontroller would be transmitted to said control unit's microcontroller through said CCS line.

5. A method of controlling a commercial or residential hot water heating system comprising the steps of:

a. generating an electric signal from a thermal sensor positioned on a water heater's cold water inlet conduit to a microcontroller positioned on a circuit board in a backward-compatible, programmable, on-demand water heater and recirculation pump control unit ("control unit"), said thermal sensor sensing a temperature differential caused by a surge of cold water in said cold water inlet conduit, b. said microcontroller interpreting said signal as a demand for hot water by said water heater, c. said microcontroller generating an activation signal to an electric motor positioned inside said control unit, d. said electric motor turning a pinion with teeth meshing with a main gear attached by a mating spline to a water heater temperature set point control shaft, e. said hot water temperature set point control shaft moving said water heater's temperature set point control to its highest setting, and f. heating water in said water heater based upon demand by a user.

6. The method of controlling a commercial or residential hot water heater according to claim 5 further comprising the steps of said microcontroller, simultaneously with generating said command to said motor:

a. generating an activation command to a recirculation system control unit, b. said recirculation system control unit activating a recirculation pump electrically attached to said recirculation system control unit, and c. said recirculation pump recirculating water through said commercial or residential recirculation system.

7. The method of controlling a commercial or residential hot water heating system according to claim 5 or 6 further comprising the steps of;

a. inputting into a remote command signal computer and control unit's ("remote unit") microcontroller, commands for said remote unit's microcontroller to generate said command signals to said control unit's microcontroller to generate said activation signal immediately or at some future dates and times for said microcontroller to generate said activation signals, b. said remote unit's microprocessor transmitting said command to said control unit's microprocessor, and c. said control unit's microcontroller executing said commands immediately or at said desired future dates and times.

* * * * *